(12) United States Patent
Liu et al.

(10) Patent No.: US 7,783,117 B2
(45) Date of Patent: Aug. 24, 2010

(54) SYSTEMS AND METHODS FOR GENERATING BACKGROUND AND FOREGROUND IMAGES FOR DOCUMENT COMPRESSION

(75) Inventors: Che-Bin Liu, Milpitas, CA (US); Anoop K Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 820 days.

(21) Appl. No.: 11/691,339

(22) Filed: Mar. 26, 2007

(65) Prior Publication Data

US 2007/0189615 A1 Aug. 16, 2007

Related U.S. Application Data

(63) Continuation-in-part of application No. 11/202,720, filed on Aug. 12, 2005, now Pat. No. 7,557,963.

(51) Int. Cl.
G06K 9/36 (2006.01)
G06K 9/46 (2006.01)
(52) U.S. Cl. .................. 382/232; 382/164; 382/173; 382/199
(58) Field of Classification Search .......... 382/162, 382/164, 165, 173, 199, 232, 243, 264
See application file for complete search history.

(56) References Cited

U.S. PATENT DOCUMENTS

| 5,555,556 A | 9/1996 | Ozaki |
| 5,778,092 A * | 7/1998 | MacLeod et al. ............ 382/176 |
| 5,790,114 A | 8/1998 | Geaghan et al. |
| 5,802,203 A | 9/1998 | Black et al. |
| 5,956,468 A | 9/1999 | Ancin |
| 6,097,849 A | 8/2000 | Nevis |
| 6,227,725 B1 | 5/2001 | Ancin et al. |
| 6,275,304 B1 | 8/2001 | Eschbach et al. |
| 6,621,595 B1 | 9/2003 | Fan et al. |
| 6,633,670 B1 | 10/2003 | Matthews |
| 6,641,053 B1 | 11/2003 | Breidenbach et al. |
| 6,701,010 B1 | 3/2004 | Katsuyama |
| 6,701,012 B1 | 3/2004 | Matthews |
| 6,701,020 B2 | 3/2004 | Chrysafis et al. |
| 6,728,005 B1 | 4/2004 | Jia et al. |
| 6,731,814 B2 | 5/2004 | Zeck et al. |
| 6,771,816 B1 | 8/2004 | Gaither |
| 6,802,611 B2 | 10/2004 | Chu et al. |
| 6,879,733 B2 | 4/2005 | Shu et al. |
| 6,879,734 B2 | 4/2005 | Chen et al. |
| 6,941,011 B2 | 9/2005 | Roylance et al. |
| 6,941,024 B2 | 9/2005 | Mukherjee |
| 7,027,647 B2 * | 4/2006 | Mukherjee et al. .......... 382/173 |
| 2001/0000314 A1 | 4/2001 | Queiroz et al. |
| 2001/0000711 A1 | 5/2001 | Queiroz et al. |
| 2001/0031092 A1 | 10/2001 | Zeck et al. |
| 2002/0168105 A1 | 11/2002 | Li |
| 2003/0031377 A1 | 2/2003 | Ahn |
| 2003/0048954 A1 | 3/2003 | Matthews |
| 2003/0072487 A1 | 4/2003 | Fan et al. |

(Continued)

Primary Examiner—Phuoc Tran

(57) ABSTRACT

Disclosed are embodiments of systems and methods to generate background and foreground images for a document, which enables high-quality and high-ratio document compression. In embodiments, high-accuracy layer processing enables text enhancement, paper color removal, and many other advanced image analysis and processing. Embodiments of the systems support several operation modes and its many parameters, such as layer compression ratios, image segmentation, and modulized image processing, may be adjusted to generate optimal compressed files for different purposes.

20 Claims, 33 Drawing Sheets

U.S. PATENT DOCUMENTS

| | | |
|---|---|---|
| 2003/0077561 A1 | 4/2003 | Alsop et al. |
| 2003/0156118 A1 | 8/2003 | Ayinde |
| 2004/0017579 A1 | 1/2004 | Lim |
| 2004/0027618 A1 | 2/2004 | Nakamura et al. |
| 2004/0042680 A1 | 3/2004 | Saund |
| 2004/0153461 A1 | 8/2004 | Brown et al. |
| 2004/0165786 A1 | 8/2004 | Zhang et al. |
| 2004/0174546 A1 | 9/2004 | Guleryuz |
| 2004/0175037 A1 | 9/2004 | Guleryuz |
| 2004/0227758 A1 | 11/2004 | Curry et al. |
| 2005/0175249 A1 | 8/2005 | Ferlitsch |
| 2005/0244065 A1 | 11/2005 | Malvar et al. |
| 2005/0281474 A1 | 12/2005 | Huang |

* cited by examiner

くださ い。
(042)585
430 ～ 専用窓口です。
製品に関す

Non-Halftone Edges Prior
to Refinement
410

くださ い。
(042)585
440 ～ 専用窓口です。
製品に関す

Non-Halftone Edges After
Refinement
420

FIGURE 4

Scanned Image on Strongly Colored Paper
610

Processed Image after Label-Aided Background Estimation
620

1310

| 1 | 1 | 1 |
|---|---|---|
| 1 | 0 | 0 |
| 0 | 0 | 0 |

1320

| 0 | 0 | 0 |
|---|---|---|
| 0 | 0 | 1 |
| 1 | 1 | 1 |

| 1 | 0 | 1 |
|---|---|---|
| 1 | 1 | 0 |
| 0 | 1 | 1 |

1 = Foreground Pixel
0 = Background Pixel

FIGURE 14

Input Image
1500

Background Layer
1600

Foreground Layer
1610

Mask
1700

Composite Image
1800

Enhanced Image 2510

Background Color Label 2520

X-Label 2530

Initial Text Mask
2600

Text Mask After Constant-Tone Detection
2800

¥38,000(標準価格／税別)

Input RGB Image
2910

Initial Text Mask
2920

Mask After Thinning
2930

FIGURE 29C

Background Image After Removing Text
3010

Background Image After Fill-In and Smoothing
3020

Initial Alpha Image
3210

Dilating Text Region
3220

Fill-In From Top-to-Bottom and Left-to-Right
3230

Fill-In From Bottom-to-Top and Right-to-Left
3240

Illustration of Fill-In for Background Region
3300

SYSTEMS AND METHODS FOR GENERATING BACKGROUND AND FOREGROUND IMAGES FOR DOCUMENT COMPRESSION

CROSS-REFERENCE TO RELATED APPLICATIONS

This application is a continuation-in-part of, and claims the priority benefit of, commonly-assigned U.S. patent application Ser. No. 11/202,720, filed on Aug. 12, 2005, now U.S. Pat. No. 7,557,963 entitled "LABEL AIDED COPY ENHANCEMENT," by Anoop K. Bhattacharjya. The subject matter of the foregoing is incorporated herein by reference in its entirety.

This application is also related to co-pending, commonly-assigned U.S. patent application Ser. No. 11/691,418, filed on Mar. 26, 2007, entitled "SYSTEMS AND METHODS TO CONVERT IMAGES INTO HIGH-QUALITY COMPRESSED DOCUMENTS," by Che-Bin Liu and Anoop K. Bhattacharjya. The subject matter of the foregoing is incorporated herein by reference in its entirety.

BACKGROUND

A. Technical Field

The present invention pertains generally to digital image processing, and relates more particularly to image processing that allows for enhanced quality of images while achieving high compression ratios. The present invention may be incorporated into systems and methods.

B. Background of the Invention

With the proliferation of computer technology and devices capable of multimedia applications, storing, displaying, and transmitting images has likewise become quite prevalent. The ability to store, display, or transmit images is related to the file sizes of the images. Image files with smaller file sizes can be processed faster and can be more readily transmitted or stored than images with large files sizes.

Uncompressed digital documents typically have large file sizes. Digital files obtained from scanning documents can also have large file sizes, particularly if scanned at high resolution. To reduce the file sizes, a compression algorithm may be applied to the file.

Although compression methods help reduce file sizes, the compressed files are typically not without problems. Conventional image compression approaches that compress an entire image generally lead to unsatisfactory results in reconstructed image quality and compressed file size. When a high compression ratio is used, the compressed images may show disturbing artifacts, such as blurred text and blurred color boundaries. To obtain a high-quality compressed image, the compression ratio may need to be set very low, but the resulting file size will therefore not be substantially reduced. Thus, neither approach is particularly satisfactory.

Accordingly, what is needed are systems and methods that allow for high compression ratios of an image but that also maintain image quality.

SUMMARY OF THE INVENTION

Aspects of the present invention provide label aided enhancement for subsequent high-quality copy generation or other rendering. In particular, regions within the scanned document are identified and labeled according to their particular content. This content may be text; image, background or other content known within the art and corresponding label information is leveraged to perform various enhancement and content refinement functions. For example, a region labeled as text may be enhanced using a different method as compared to a region labeled as image.

In one embodiment of the invention, regions within a scanned document are identified and labeled based on an analysis of pixel edge information within each region. Pixel gradient calculations are performed and analyzed in order to identify edge pixels within a particular region. The identified edge pixels may be further analyzed to determine an edge type for each of the edge pixels. Using this pixel edge and edge type information, regions may be tentatively identified within the scanned document according to content, such as text, image, and background regions.

In yet another embodiment of the invention, identified background regions may be used to identify the paper color of the original document and allow compensation for any page-color background manipulation operations. Other colors outside of the background region may also be remapped to maintain appropriate color relationships when the page background color is manipulated. For example, background colors, and if necessary other colors within the scanned document, may be mapped back to a preferred reference background color using various color translation and transformation methods.

In still yet another embodiment of the invention, multi-region enhancement may be performed on the scanned document. This multi-region enhancement may include a region adaptive descreening method during which unwanted halftone is removed from the scanned document, and a region dependent sharpening method in which regions are sharpened according to their content. For example, a text region may be sharpened using a standard unsharp masking algorithm.

The labeling of the scanned document may be further leveraged in both rendering and storing (e.g., region-dependent compression) the entire document or portions thereof. It is therefore an object of the present invention to provide systems and methods that allow for high compression ratios of an image but also maintain image quality.

Aspects of the present invention provide systems and methods for providing high compression ratios of an image but also maintain image quality. In embodiments, an input image may be compressed but maintain high-quality by separating certain features, such as text and other fine features, into a layer separate from other features that are not as compression sensitive.

In embodiments, a plurality of pixels selected from the input image may be labeled. In an embodiment, background text pixels, which may comprise small-size regions and thin features that fit within one of a plurality of bounding boxes, may be identified as being part of a foreground image layer and a background image layer may also be generated that comprises the remaining pixels from the plurality of pixels. In embodiments, a mask layer may be generated that identifies from which of the background and foreground image layers a pixel should be selected when generating a representation of the input image. Having separating the input image into layers to minimize the adverse effects due to compression, a first compression algorithm may be used to compress the mask layer and at least one different compression algorithm may be used to compress the foreground and background image layers. Through the mask, items are identified where detail is preferably preserved when rendering the composite image and a lossless compression algorithm may be used. In embodiments, the foreground and background image layers may be compressed using a lossy algorithm. In an embodiment, the foreground and background image layers may also be downsampled.

In an embodiment, labeling may be performed using the systems or methods disclosed with respect to the label aided copy enhancement provided herein. One skilled in the art shall recognize that other labeling or segmentation systems or methods may also be employed.

In embodiments, as part of the label aided copy enhancement or performed separately or additionally, a background of the input image may be estimated. In an embodiment, responsive to estimating a background color, one or more pixels may be relabeled.

In an embodiment, the non-background regions may be identified by using the pixel labels to generate a background mask comprising pixels with a background label, performing a connected component analysis on non-background pixels of the background mask, and responsive to a connected component group of non-background pixels being below a threshold size, selecting the pixels corresponding to the connected component group as non-background region pixels. In an embodiment, the threshold size of the connect component group may refer to the number of pixels of the connect component group, may refer to a size (pixel or otherwise) of a region that bounds the connect component group, or both.

In an embodiment, systems and methods of the present invention may provide for selection of different modes, wherein different features may be included in the foreground and/or mask layers. In an embodiment, a photo mode may result in a foreground image layer comprising the non-background regions. In embodiments, in a magazine or text mode, solid regions may also be included as non-background regions in the foreground image layer.

In embodiments, the solid regions may be obtained by generating an edge mask comprising pixels labeled as edge pixels. In an embodiment, the edge mask may be dilated toward non-background regions of the edge mask. The labeled pixels and the dilated edge mask may be used to identify solid region pixels. In embodiments, line scans may be used to identify a non-edge-pixel segment bounded by a first edge pixel segment and a second edge pixel segment. A first color value may be computed for the first edge pixel segment. A second color value may be computed for the second edge pixel segment, and a non-edge-pixel segment color value may be computed for the non-edge-pixel segment. In embodiments, the color values may be the mean, median, or mode of a segment. In an embodiment, responsive to the difference between the non-edge-pixel segment color value and the average of the first and second color values being below a threshold value, the combined first edge pixel segment, second edge pixel segment, and non-edge-pixel segment may be identified as solid color region pixels and included in the foreground image layer.

In embodiments, the selection of a solid color region as a non-background region may include one or more constraints. In embodiments, the number of pixels of a combination of the first edge pixel segment, the second edge pixel segment, the non-edge-pixel segment, or portions thereof may be required to be below a threshold limit. If the size constraint is met, the combined first edge pixel segment, second edge pixel segment, and non-edge-pixel segment may be identified as solid color region pixels and included in the foreground image layer. In an embodiment, additional or alternative constraints may be imposed upon a line scan in order for it to be classified as solid region pixels. In an embodiment, an additional or alternative constraint may be that at least a portion of the preceding line scan be identified as edge pixels or solid color region pixels.

In embodiments, after separating the input image into two layers, color interpolation may be performed to fill blank areas in the image layers. In an embodiment, a filter or a set of filters may be applied to a foreground and/or background image layers to fill the image layer. In an embodiment, open areas in the background image layer corresponding to non-background regions may be filled with the background color.

In embodiments, layer-based color enhancement may be performed to enhance one or more of the layers. In an embodiment, non-background regions on the foreground layer may be smoothed and color enhanced. In an embodiment, solid color regions may also be enhanced. In embodiments, the color enhancement may be conditionally performed based on local color statistics.

In embodiments, smoothing may be performed by applying a filtering operation to one or more of the layers. In one embodiment, the filtering operation may comprise setting a pixel value to the average value of the like-labeled pixels within a neighborhood of that pixel.

In embodiments, because the background color may have been estimated, different levels of background or paper color suppression may be applied. In an embodiment, the brightness of the mean background color in Hue-Saturation-Value (HSV) color space may be determined. If the background is not within a light color range, the background may not be suppressed in order to reflect the true background color. In an embodiment, a small background block may not be suppressed.

In an embodiment, in the text mode, big background blocks may be replaced with white color. In an embodiment, background pixels may be completely replaced with white color if the true background color is bright and close to white color. In an embodiment, in the magazine mode, background color may be shifted toward white color. In an embodiment, background pixels may be shifted in color halfway toward white color.

In embodiments, a representation of the input image, or composite document, may be obtained from the foreground, background, and mask layers. In one embodiment, the composite document may use a portable document format.

Aspects of the present invention may be incorporated or included in a system or systems. It should be noted that the teachings of the present invention may be implemented in any device or system that is capable of receiving and processing a digital image, included but not limited to computers, multimedia devices, scanners, printers, copiers, cameras, and the like.

Aspects of the present invention may be implemented in a wide variety of ways including software, hardware, firmware, or combinations thereof. For example, the functions to practice various aspects of the present invention may be performed by components that are implemented in a wide variety of ways, including discrete logic components, one or more application specific integrated circuits (ASICs), and/or a program or programs of instructions for execution by one or more program-controlled processors. It shall be noted that the manner in which the present invention is implemented is not critical.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 4 is illustrations of examples of non-halftone edges prior to and after refinement according to one embodiment of the invention.

FIG. 13 depicts a set of filters that may be applied to a foreground image layer and/or a background image layer to fill the image layer according to an embodiment of the invention.

FIG. 14 depicts an example of a smoothing filter that may be applied to an image layer according to an embodiment of the invention.

FIGS. 25A-C depicts example outputs from a label aided copy enhancement system according to an embodiment of the invention, wherein FIG. 25A is an example of an enhanced image; FIG. 25B is an example of a background color label; and FIG. 25C is an example of a labeled image.

FIGS. 29A-C illustrate the result of text thinning according to an embodiment of the invention, wherein FIG. 29A depicts an example of an input RGB image; FIG. 29B depicts an example of an initial text mask; and FIG. 29C depicts an example of a mask after thinning.

FIGS. 32A-D depict examples of alpha images according to embodiments of the invention, wherein FIG. 32A depicts an example of an initial alpha image; FIG. 32B depicts an example of the image with dilated text region; FIG. 32C depicts an example of a fill-in from top-to-bottom and left-to-right; and FIG. 32D depicts an example of a fill-in from bottom-to-top and right-to-left.

DETAILED DESCRIPTION OF THE PREFERRED EMBODIMENTS

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, mobile devices, including those devices with a display or camera capabilities, multimedia devices, and the like. The embodiments of the present invention may be implemented in software, hardware, firmware, or combinations thereof. Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment.

As previously noted, some conventional image compression efforts to reduce file sizes of images have yielded unsatisfactory results. For example, when a high compression ratio is used, the compressed images show disturbing artifacts, and when a low compression ration is used, the resulting file size is not substantially reduced. Thus, neither approach is particularly satisfactory.

Figure 1:
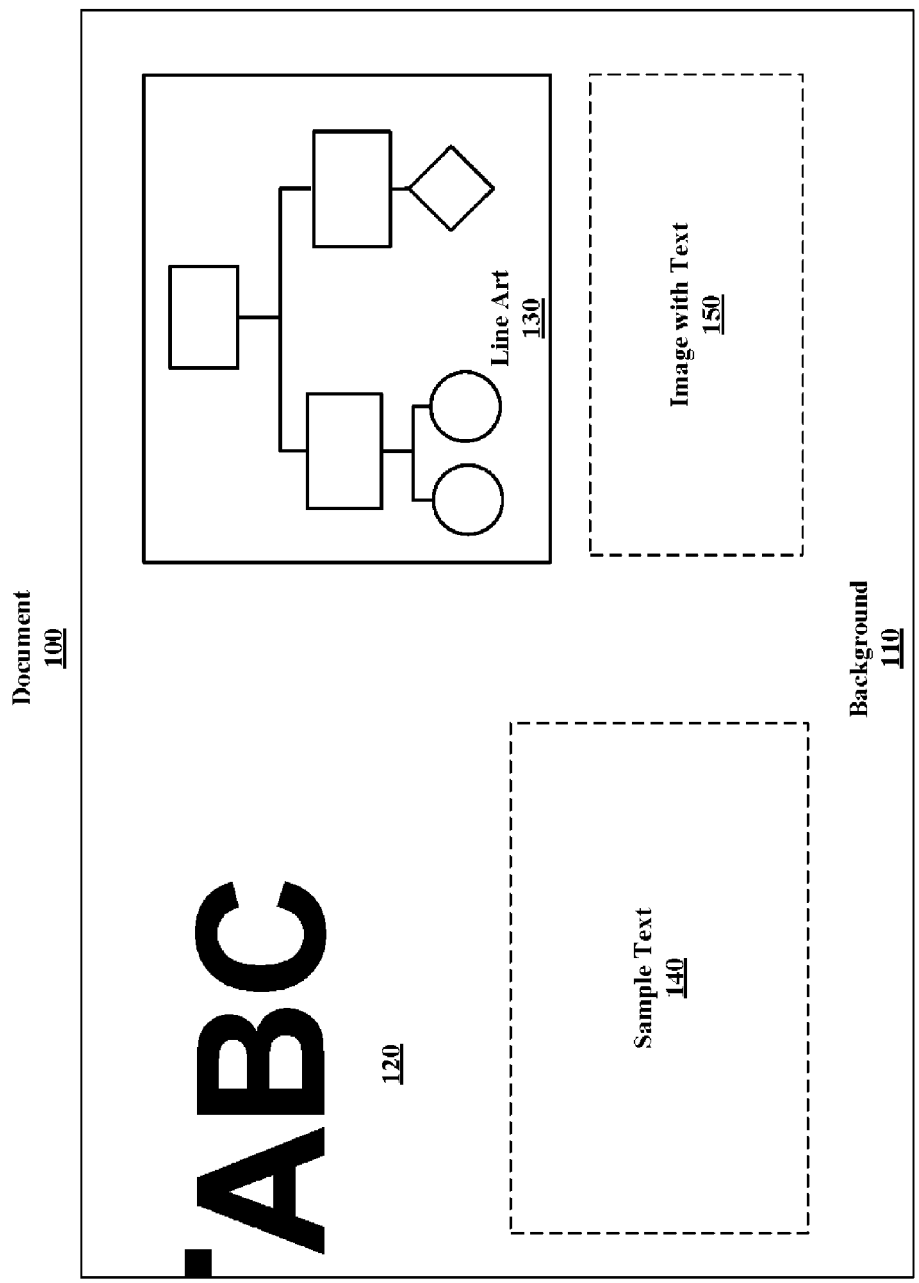
FIG. 1 depicts, for purposes of illustration, an example of an image document 100 that may be processed according to an embodiment of the invention.

Consider, by way of example, the exemplary document 100, having different content regions, which is depicted in FIG. 1. As shown, the document 100 has a first region 120 containing text, a second region 130 comprising a line art flow chart, a third region 140 containing text, a fourth region 150 containing text integrated within an image, and a fifth region 110 representing the background of the document 100. Using a high-compression algorithm for the document may result in blurring of the text or line art; while using a low-compression algorithm may not satisfactorily reduce the file size.

Context-based image compression can alleviate the aforementioned problems. In context-based image compression, an image is separated into layers, which can be compressed independently using different compression strategies. If each of such image layers is generated so that it contains less sharp color changes in neighboring pixels, the compression ratio can be very high while maintaining very good image quality. A significant issue in context-based image compression is determining how to decompose the image into layers. Decomposition methods may have a significant effect on the compressibility of the layers and on the quality of the image that is reconstructed from the compressed layers. Disclosed herein are robust approaches to generate layered images, which are referred to herein as background and foreground images layers, for each input image with the aim to enhance quality of compressed images while achieving high compression ratio for applications using context-based image compression.

Figure 2:
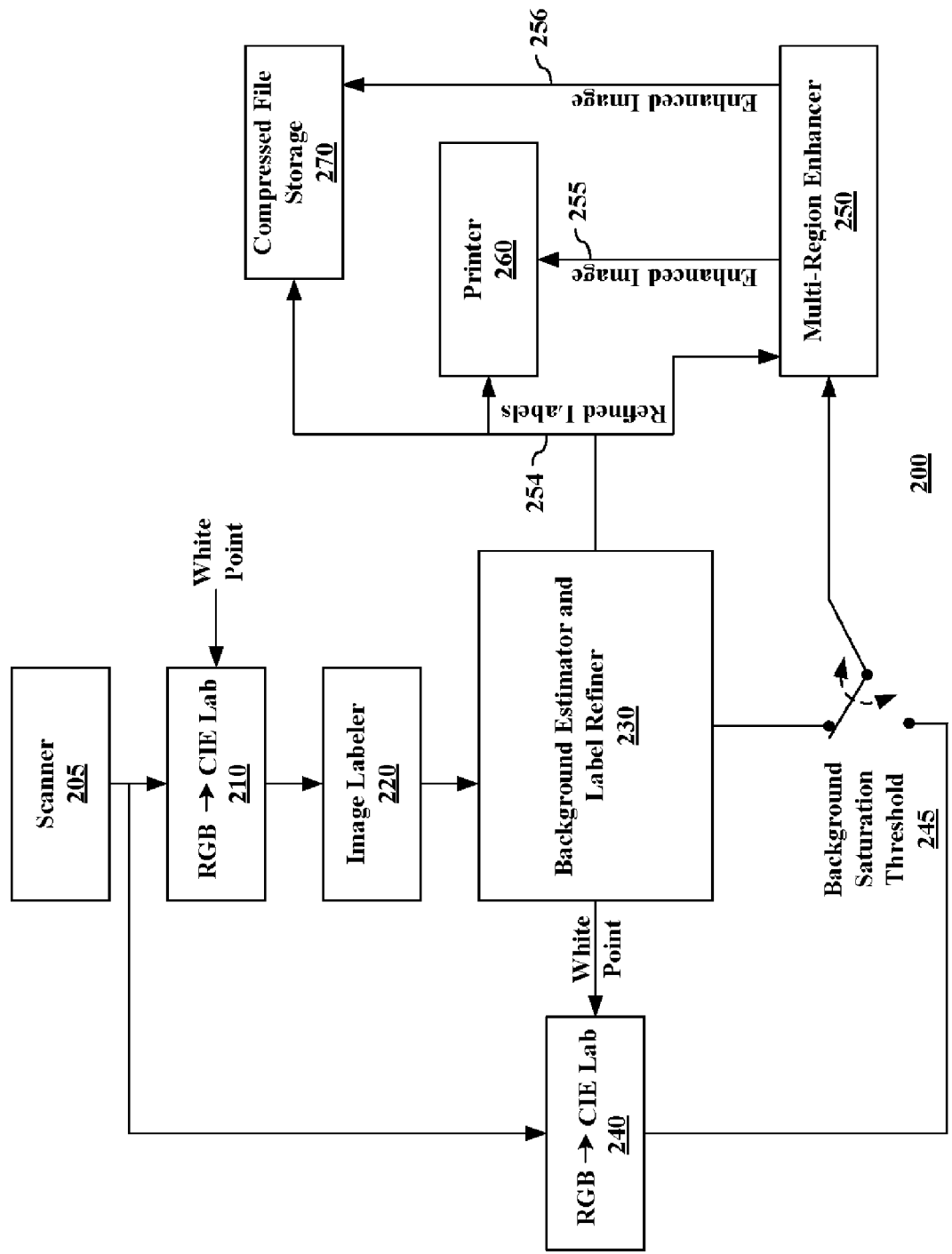
FIG. 2 is a general block diagram of a system for label aided document copy enhancement according to one embodiment of the invention.

FIG. 2 illustrates a system for document copy enhancement and color compensation according to an embodiment of the invention. Each of the components within the system will be described in greater detail in the sections below.

A scanner 205 is used to create a digital version of a hard copy document, that is, a physical medium, e.g., paper, document. Other devices, such as a printer, copier, camera, or facsimile machine may also be used to generate a digital version of a physical document. The term "scanned document" is used herein to refer to a digital document generated from a physical document by any of these or other known means. A data converter 210, in this embodiment an RGB to CIE Lab converter, is used to convert the scanned document, which is typically captured in RGB color space, into a device-independent perceptually-uniform color space. This conversion typically employs a color profile of the scanner 205 and a white point reference color.

The device independent data of the scanned document is provided to an image labeler 220 that tentatively identifies and labels content types, such as text, images and background, within the scanned document. In identifying content types, the image labeler 220 identifies and labels edge types in the scanned document. A subsequent analysis of the amount and types of edges within a particular region is performed to tentatively label corresponding content. This labeled content and edges may be subsequently refined to improve the classification of image regions using information about other labels in the neighborhood of each label within the scanned document.

A background estimator and label refiner 230 builds a three-dimensional histogram of colors that have been marked as tentative background pixels. Using this histogram, a background color is selected and the colors in the histogram mapped to a preferred background color (e.g., a white background). A background saturation threshold 245 is used to exclude strongly saturated colors from the histogram and improve the resolution of the histogram by limiting the range of examined colors. The identification of background pixels is refined so that colors from pixels labeled as halftone are not included as background pixels.

Once the background pixels have been identified and the pixels have been labeled, a multi-region enhancer 250 further enhances the labeled document. This enhancement may include a region adaptive de-screening process and a region dependent sharpening. After the multi-region enhancement, the labeled document can be used to perform differential enhancement for viewing or printing.

In one embodiment of the invention, the labeled and enhanced document 255 is sent to a printer 260, which may require higher levels of sharpening for high-quality text as compared to, for example, text that is viewed on a computer screen. Refined label information 254 may also be used to switch between printer/screens color tables to improve the rendering of non-halftone edges that typically correspond to text on background regions. For example, lower frequency screens may be used over pixels labeled halftone edge or halftone to improve tone stability in devices such as color laser printers.

The labeled and enhanced document 256 may also be separated into text, line art, image layers and other content to facilitate high-compression storage by storage device 270 that may use specialized codecs for each type of content. The labeled and enhanced document may also be used to preprocess and present pertinent regions, such as text regions, to an optical character recognition system.

C. Image Labeling

Figure 3:
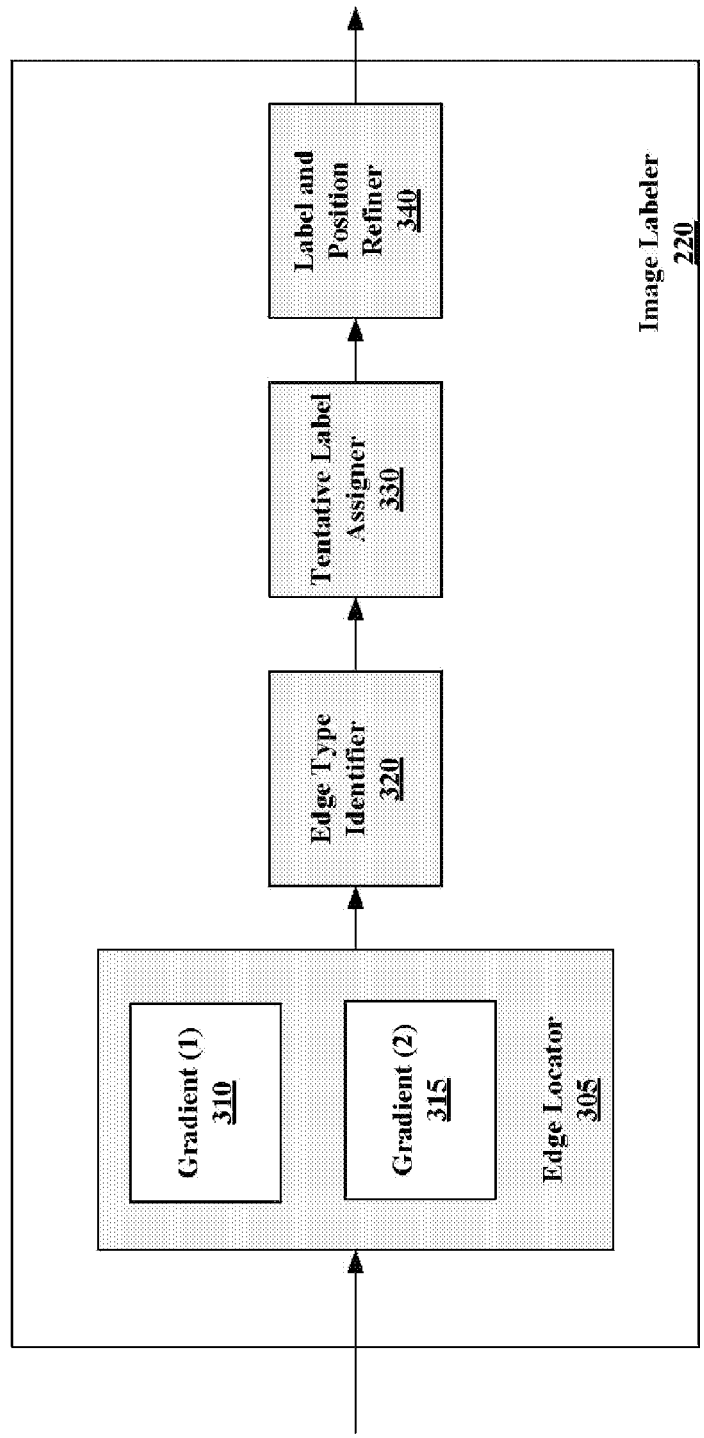
FIG. 3 is a block diagram of an image labeling module according to one embodiment of the invention.

FIG. 3 illustrates an image labeler 220 according to one embodiment of the invention. The image labeler 220 may include an edge location identifier 305, an edge type identifier 320, a tentative label assigner 330, and a label refiner 340. In one embodiment of the invention, the edge location identifier 305 comprises a first gradient module 310 and a second gradient module 315 that compute gradient values for each pixel, or at least a plurality of pixels, in the scanned document. These gradient calculations are used to identify edge pixels, which are pixels that relate to an edge of text, an image, or other content within the document copy. These edge pixels may be further characterized as fine edges, coarse edges, very coarse edges, or other types of edges and correspond to using different filter kernels for edge computation. One skilled in the art will recognize that various mathematical calculations may be performed in which edge pixels within a document copy may be identified; these various calculation methods are intended to be within the scope of this invention.

In one embodiment, the first gradient module 310 computes a first gradient value representing a horizontally-oriented edge element, for each pixel, according to:

$$h_{ij} = ((L_{i+1,j} \geq L_{ij})?1:-1) \times \|Lab_{i+1,j} - Lab_{ij}\|$$

The second gradient module 315 computes a second gradient value representing a vertically-oriented edge element, for each pixel, according to:

$$v_{ij} = ((L_{i,j+1} \geq L_{ij})?1:-1) \times \|Lab_{i,j+1} - Lab_{ij}\|$$

where $Lab_{ij}$ denotes the CIE Lab color at pixel (ij), and $\|\ \|$ denotes the $L^2$ norm. A threshold is defined to which a comparison is made in order to identify edge pixels. For example, consider an edge threshold of $t_e$, a pixel (i,j) is identified an edge pixel if one of the following is true:

$$((abs(h_{ij}) > t_e)\char`^(h_{ij} > 0)), \quad (1)$$

$$((abs(h_{i-1,j}) > t_e)\char`^(h_{i-1,j} < 0)), \quad (2)$$

$$((abs(v_{ij}) > t_e)\char`^(v_{ij} > 0)), \text{ or} \quad (3)$$

$$((abs(v_{i,j-1}) > t_e)\char`^(v_{i,j-1} < 0)) \quad (4)$$

where abs(x) denotes the absolute value of x.

By comparing the calculated pixel gradients, within the scanned document, to each of the four criteria, edge pixels are identified.

The edge type identifier 320 identifies a type of edge for each of the identified edge pixels. According to one embodiment of the invention, two low-pass filters are used on the gradient pixels in order to identify different types of edges associated with the pixels. These low-pass filters process a particular region in order to identify edges within a region and ascertain a type of edge for each of the identified edges. By using multiple filters on the pixels, a relatively more complete capture of pixel information and edge information is provided. In one embodiment of the invention, edges may be defined at three different levels to be fine edges, coarse edges and very coarse edges. The fine edges provide well localized edges with relatively sharp boundaries. The coarse and very coarse edges are typically the result from halftones from true-image feature edges and generally provide poor information about edge location and fine-detail information about the edge itself. The edge type identification module 320 labels each of the edge pixels according to its identified type.

The tentative label assigner 330 estimates tentative halftone and background regions within the scanned document. According to one embodiment, this estimation is performed by analyzing the fine edges identified by the edge type identifier 320. In particular, the number or quantity of identified fine edges is compared to a threshold value, and if the number of fine edges within a particular region is below the threshold, the region is tentatively labeled as background. These tentatively labeled background regions may be later refined based on a color histogram analysis of labeled background pixels, within the region, to identify which pixels actually correspond to the document background.

The tentative label assigner 330 may also identify tentative halftone pixels based on an analysis of identified fine edges. In one embodiment, the identified fine edges are compared to another threshold value, and if the number of fine edges within a region around an edge pixel exceeds the threshold, the edge pixel is tentatively labeled as a halftone edge. Content labeling may also include an analysis of coarse and very coarse edges. For example, if a coarse edge exists in a tentative background area, the edge is labeled as a non-halftone edge. If a very coarse edge exists in a tentative halftone area, the edge is labeled as a halftone edge.

The label and position refiner 340 refines the labels within the scanned document by analyzing tentatively labeled edges within a particular region. In one embodiment of the invention, tentative labels are refined according to the following parameters:

(a) if a connected set of non-halftone edge pixels is adjacent to a halftone edge pixel, all the pixels in the connected set are relabeled as halftone edges, or vice versa;

(b) non-halftone edges are refined to obtain edges of higher location accuracy; and (c) halftone edge components that are below a particular size are relabeled as halftone pixels.

The label and position refiner 340 may also refine the position of non-halftone edges. According to one embodiment, non-halftone position is refined according to the following parameters:

(a) determine fine edge components that have a partial overlap with a non-halftone edge component; and (b) replace the entire non-halftone edge component, which has a partial overlap with a fine edge component and do not overlap a halftone edge component, with a corresponding set of fine edge components.

These fine edge components are labeled as non-halftone edges. Because the fine edges have higher location accuracy, the location of the non-halftone edges is dramatically improved.

FIG. 4 illustrates an exemplary result of the above-described label and position refinement. Non-halftone edges, prior to refinement, 410 are shown and characters 430 therein appear thick and imprecise. Comparatively, after refinement, non-halftone edges 420 are shown and characters 440 therein are much more precise because of the superior location accuracy of the character fine edges that replaced the coarse non-halftone edges.

D. Background Estimation and Label Refinement

Figure 5:
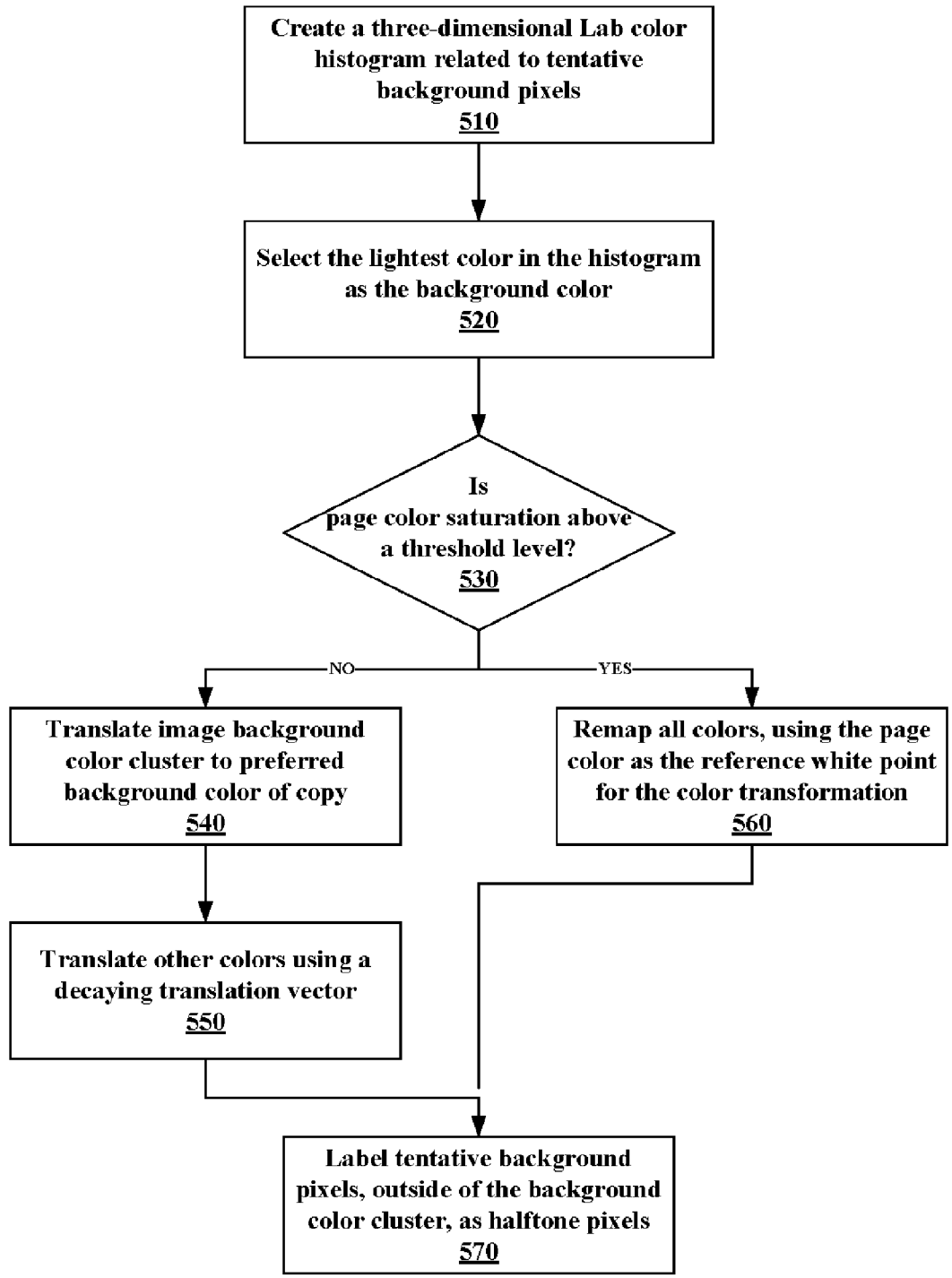
FIG. 5 is a flowchart illustrating a method for background estimation and label refinement according to one embodiment of the invention.

FIG. 5 is a flowchart illustrating a method for background estimation and label refinement according to one embodiment of the invention. As described above, an analysis of fine edges in a scanned document provides tentative labeling of background pixels. These tentative background pixels may be refined and their color appropriately modified by mapping the background color within the original document to a preferred color space for the scanned document, such as one related to a white background.

A three-dimensional color histogram in a device-independent format, such as CIE Lab, may be generated 510 for all of the colors that have been marked as tentative background pixels. One skilled in the art will recognize that various color histograms may be generated in accordance with the present invention.

In this embodiment, the lightest color peak within the three-dimensional color histogram is selected 520 as the color corresponding to the background of the document. This selected color peak may be analyzed to identify an appropriate method to map the remaining colors within the background color cluster and/or remaining colors within the scanned document to a color space corresponding to a preferred background color for the document copy. For example, the selected lightest color peak, or page color saturation, may be compared 530 to a particular threshold to identify the extent of the color distance between the background color cluster of the scanned document and the preferred color background of the document copy.

If the page color saturation is below the particular threshold, the image colors may be remapped by translating 540 all the colors within the page background color cluster. Furthermore, other colors, within the scanned document, may be translated 550 smoothly using a rapidly decaying translation vector that decays based on the distance of the color from the page background color. One skilled in the art will recognize that colors outside of the background color cluster may be translated using various techniques known within the art.

If the page color saturation is above the particular threshold, all of the colors should potentially be translated to compensate for the scanned document's strong color saturation level. In one embodiment, all colors within the scanned document are remapped 560 using the page color and the reference white point for the RGB-XYZ-Lab transformation. This transformation allows background removal of image content printed on strongly colored paper. This color transformation process may be accomplished by various methods known within the art.

The removal of background color allows for refinement of the tentatively identified background pixels within the scanned document. In one embodiment, all of the tentative background pixels within the background color cluster are labeled as true background pixels, and the remaining tentative background pixels are labeled as halftone pixels. These halftone pixels may be subsequently removed from the background.

Figure 6:
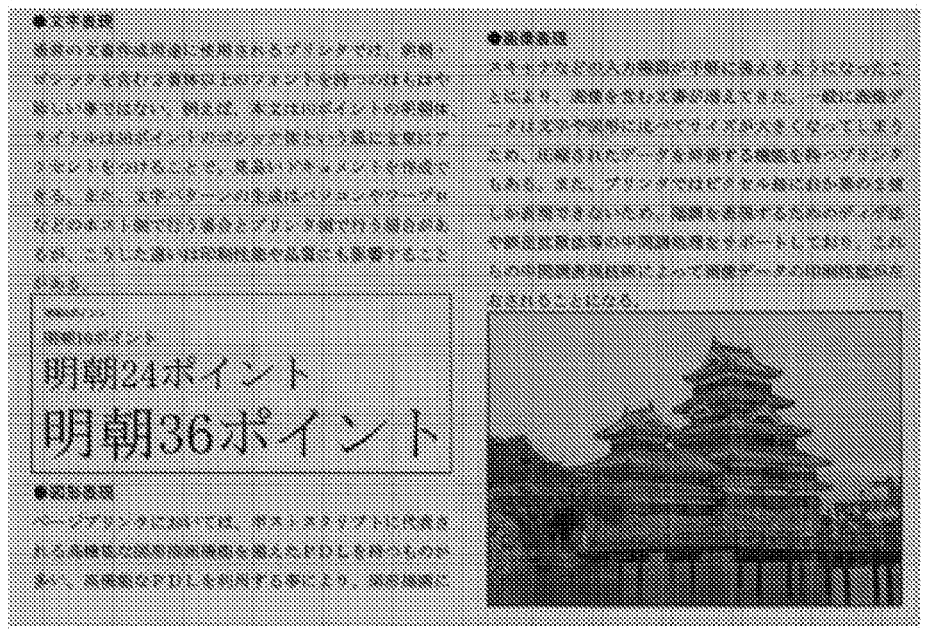
FIG. 6 illustrates documents prior to and after label aided background enhancement according to one embodiment of the invention.
Figure 6:

FIG. 6 illustrates an exemplary result of the label-aided background removal described above. As shown, a scanned document on strongly colored paper 610 may result in a grayish background if printed or viewed in a black and white environment. However, by removing the strongly colored background, and to the extent appropriate, mapping other colors to the white background, a sharper image 620 is provided. In a color environment, all image colors are appropriately remapped so that consistent color relationships are maintained with respect to the page background color.

E. Multi-Region Enhancement

Figure 7:
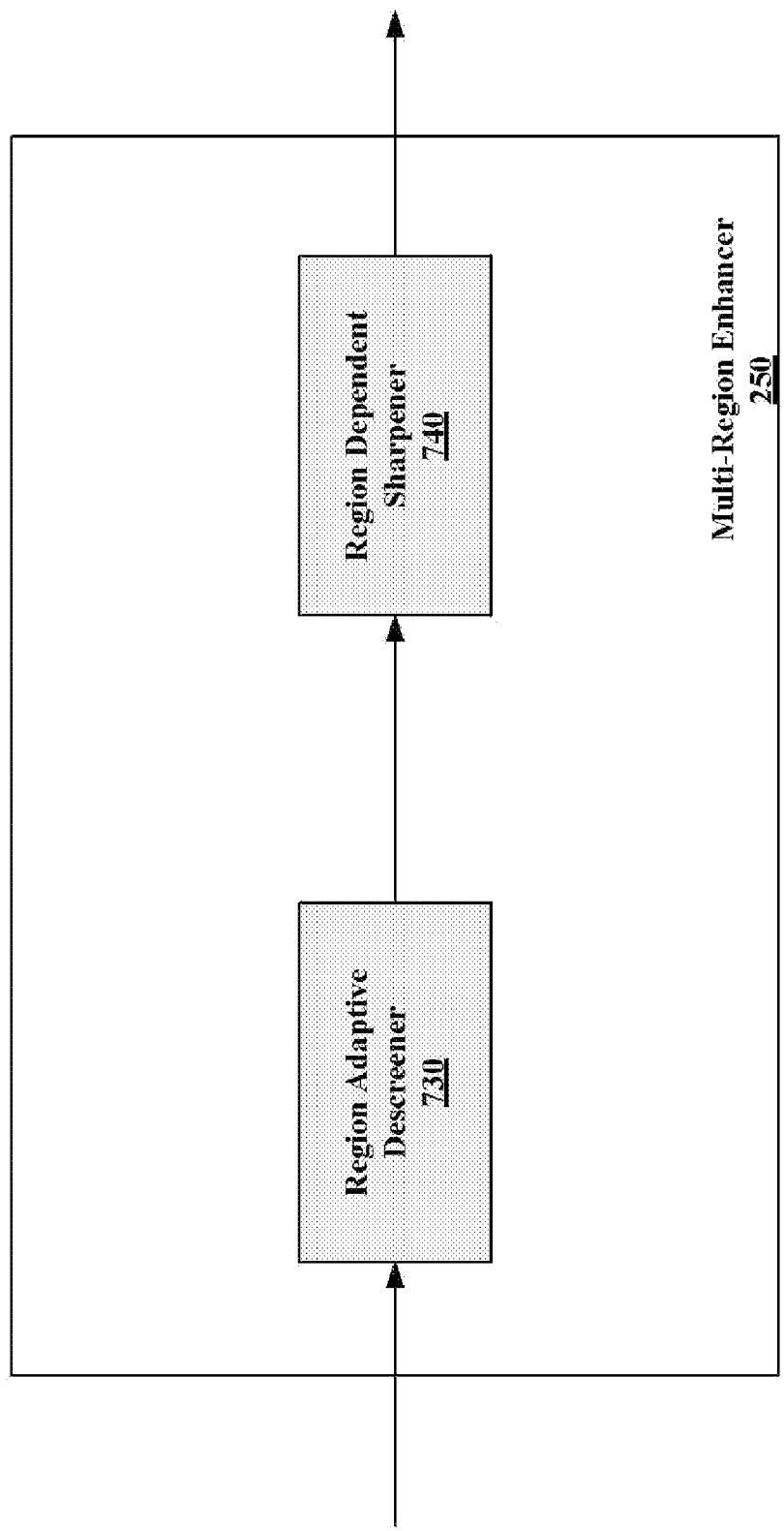
FIG. 7 is a block diagram of a multi-region enhancement module according to one embodiment of the invention.

FIG. 7 illustrates a multi-region enhancer 250 according to one embodiment of the invention. The multi-region enhancer 250 includes a region adaptive descreener 730 and a region dependent sharpener 740. The multi-region enhancer 250 uses the labeled pixels, such as the edge pixels and background pixels, to enhance the content and images in the scanned document.

In one embodiment of the invention, the enhancement occurs in two different stages. In the first stage, the region adaptive descreener 730 removes the halftones within the scanned document using a method such as the one described in FIG. 8. In the second stage, the region dependent sharpener 740 sharpens the image features using techniques known within the art, such as a standard unsharp masking algorithm.

Figure 8:
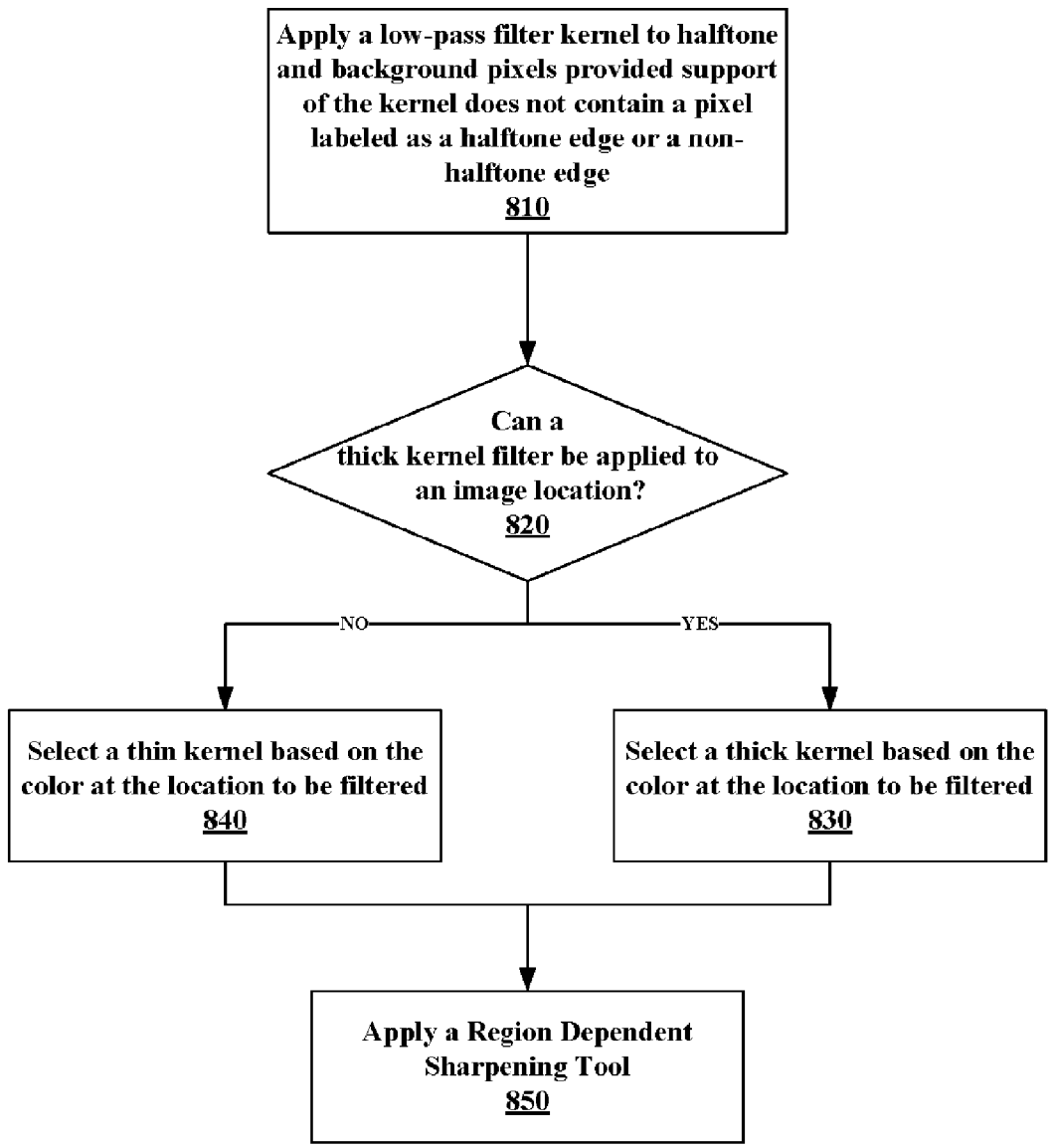
FIG. 8 is a flowchart illustrating a method for multi-region enhancement according to one embodiment of the invention.

FIG. 8 illustrates a method of multi-region enhancement, within a scanned document according to one embodiment of the invention. This enhancement method leverages the labeled regions within the scanned document, and provides region dependent descreening.

A low pass filter is applied 810 to all halftone and background pixels provided the support of the kernel does not contain a pixel labeled as a halftone edge or a non-halftone edge. The remaining unfiltered locations within the scanned document are filtered by one of two sets of oriented filter kernels. (Other sets of oriented filter kernels, having various characteristics, may also be used in other embodiments of the invention.) The first set, denoted as thick kernels, have larger support than the second set, denoted thin kernels. For each unfiltered location, if a thick kernel can be used for filtering, it is used. However, a thick filter may be used at a given location only if its support does not contain any non-halftone edge pixels. Otherwise, a thin filter kernel is used.

A first analysis of a region or image location within the scanned document may be performed to determine 820 whether a thick kernel may be applied. If any thick kernel can be applied, the filtered result may be selected 830 from the output of all the applicable thick kernels based on which output is closest to the color at the image location that is to be filtered.

Comparatively, if a thick kernel cannot be applied to the image location, a thin kernel is selected from all of the available thin kernels. Similar to the application of a thick kernel, if any thin kernel can be applied, the filtered result may be selected 840 from the output of all the applicable thin kernels based on which output is closest to the color at the image location that is to be filtered.

Analogous to sigma-filters, the weight of a given pixel color may be determined by a number of different factors including its spatial distance and its color distance to the pixel at the location to be filtered. Furthermore, instead of using a sharp color-distance cutoff, a decaying function of color distance may be used. One skilled in the art will recognize that other characteristics of a pixel may be considered in selecting an appropriate filter kernel.

In one embodiment of the invention, the input to a filter (e.g., thick or thin kernel) may be selected from the output array of previous filtered pixels whenever it is available. This output array dependent selection allows the use of a filtered estimate of pixel color for subsequent filtering whenever such an estimate is available. Additionally, this approach reduces the risk of inadequate suppression of halftones near halftone edge pixels. Furthermore, this approach may reduce the variance near halftone edge pixels resulting in a more smooth tone appearance.

Once the pixel image regions are filtered, a region dependent sharpening tool is applied 850. In one embodiment, a fast unsharp masking algorithm is used for this sharpening, which may, for example, only sharpen the L channel of the Lab image. Halftone edges and non-halftone edges may also be sharpened by similar sharpening factors to minimize visual artifacts.

The application of these image sharpening methods may result in noise in color regions and/or thickening of text regions within the scanned document. According to one embodiment of the invention, asymmetrical clipping may be performed on the sharpened L channel to minimize this noise and thickening of text regions. The actual level of clipping may vary and be determined using various methods. For example, the level of clipping may be determined by the saturation of the pixel itself. The saturation of a particular pixel may be defined by:

$$s_{lab} = \sqrt{(a^2+b^2)}$$

Let $f_{min}$ denotes the clip factor and $f_s$ be a smooth function of $s_{Lab}$ and where:

(1) $f_s$ is zero when $s_{Lab}$ is zero; and
(2) $f_s$ is 1 for a sufficiently large $s_{Lab}$.

The pixel saturation is clipped to the range [$Lf_{min}f_s$, 100] by sharpening a pixel with this L-value. One skilled in the art will recognize that various clipping techniques may be applied to a saturated pixel.

The processed scanned document may be provided to various applications and devices for enhanced rendering. These devices include but are not limited to various types of printers and display devices. Additionally, the labeled image may be used to switch between screens and color tables to improve the rendering of both halftone and non-halftone edges. As discussed in more detail below, it shall be noted that the labeled image may used to parse a document into various components, such as text and images, to facilitate compression or other processing of the document.

F. Compression System Implementations

As noted above, system 200, or portions thereof, may be used to help generate high-compression documents. A compression system may comprise system 200, or portions thereof, or may receive an output from one or more of the components of system 200 to generate a high-quality, high-compression document. A "document" shall be construed to mean a digital file, the data that comprises the document (or a portion thereof), including without limitation pixel values, or the display of the digital file, which may be displayed electronically (such as on a computer screen) or displayed on a physical medium (such as a printed paper). As used herein, the terms "image" and "document" may be used interchangeably.

In embodiments, the document compression system comprises high-quality high-compression document generation technology that builds an image layer description for an input image using pixel labeling and image segmentation techniques. This layer description is generated based on document properties to support optimized strategies to enhance and compress images. The compressed document may represent a composite of compressed image layers and may have enhanced visual quality and much smaller file size compared to conventional approaches. In an embodiment, the resulting high-quality high-compression document may be in a portable document format ("PDF"), but one skilled in the art shall recognize that other viewers and formats may be employed.

1. Exemplary Embodiment of a Document Compression System

Figure 9:
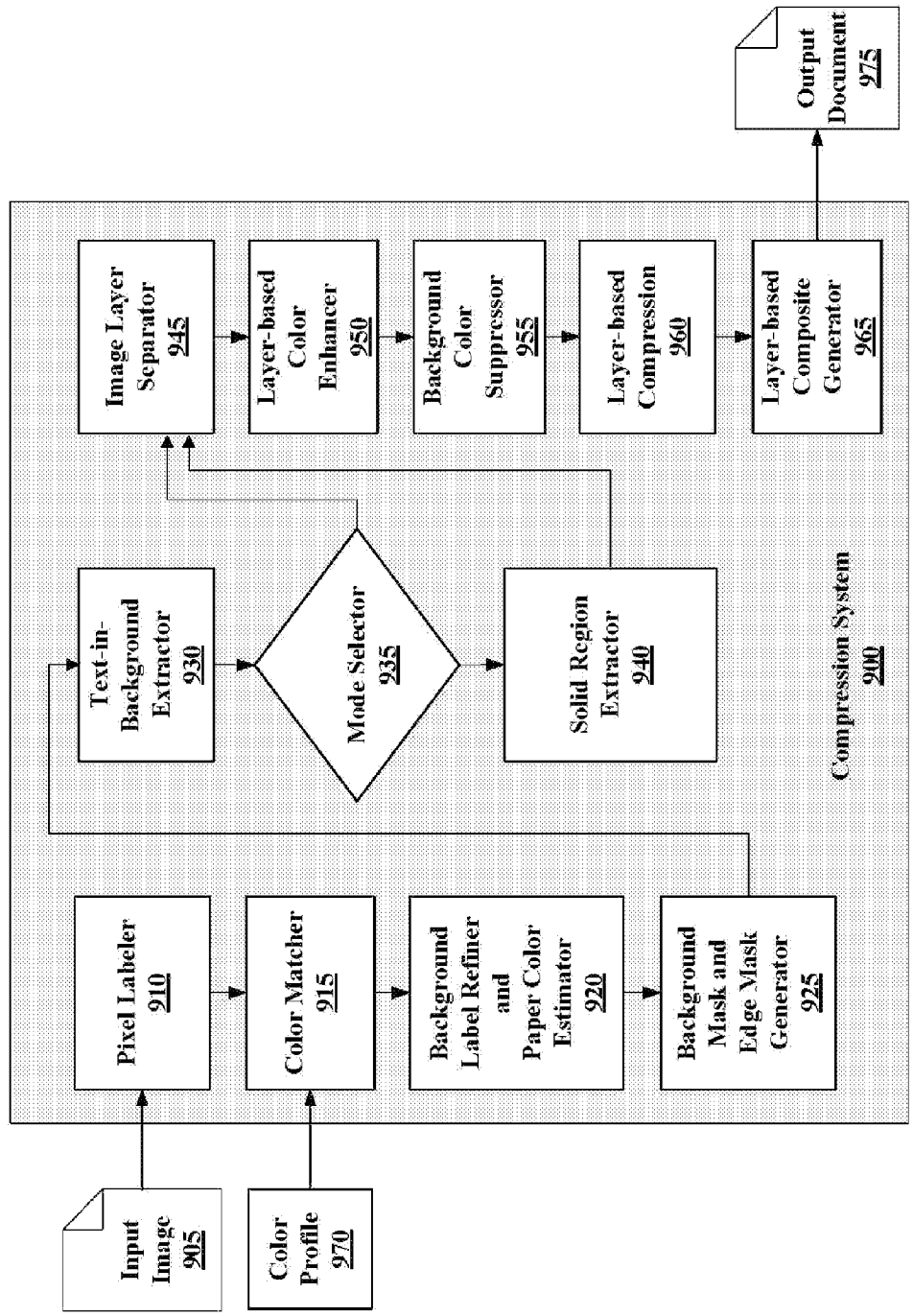
FIG. 9 is a general block diagram of a system for document compression according to an embodiment of the invention.

FIG. 9 illustrates an exemplary system 900 for generating a high-quality high-compression document according to an embodiment of the invention. As depicted in FIG. 9, a digital image 905 is provided to the compression system 900. Because the present invention may operate on a portion of an input image, it shall be understood that input image 905 may be construed to be a portion of an input image. In embodiments, the input image 905 may be an image obtained from a scanner, camera, copier, facsimile machine, or copier. In embodiments, the input image may be a digitally generated image. The components of the embodiment of the compression system 900 are described below.

a) Pixel Labeler

The compression system 900 comprises a pixel labeler 910 that receives an input image 905 and labels the image 905 at the pixel level. In an embodiment, each pixel of the image 905 may be assigned a label, such as background, halftone edge, non-halftone edge, or halftone pixel. This labeling may be referred to as X-labeling because, in embodiments, each pixel may be classified with a label selected from a group. In an embodiment, the group may comprise, but is not limited to, a background label, a halftone edge label, a non-halftone edge label, or a halftone label. It shall be noted the number, type, and classification of labels may vary. It shall also be noted that in embodiments in which the input image is a digitally generated image (such as from a computer or a digital camera) as opposed to a scanned image, halftone may not exist within the image and halftone labels may not be used.

The pixel labeler 910 may comprise all of system 200 or a portion of system 200, such as image labeler 220. In an embodiment, the pixel labeler 910 may represent that portion of system 200 that outputs enhanced image 255, 256 or refined image 254.

b) Color Matcher

In an embodiment, given a scanner, printer, copier, or display color profile 970, color matcher 915 may adjust the image 905, or one or more layers derived from the image, so that the image colors match the original document. It should be noted that color matching may be beneficial when the image information is being communicated between devices, such as, for example from one copier to another copier or to a computer screen. Accordingly, the color matcher may provide adjustments given the intended output display. In embodiments, the labeled image may be used to perform differential enhancement for viewing or printing of the compressed image. For example, printing often requires higher levels of sharpening for high-quality text than what would be required for viewing on a computer screen. The label information may also be used to switch between printer/screen color tables to improve the rendering of the image or portions thereof, such as non-halftone edges that typically correspond to text on background regions. For example, lower frequency screens may be used over pixels labeled halftone edge or halftone to improve tone stability in devices such as color laser printers and may also provide a greater number of tones.

c) Background Label Refiner and Paper Color Estimator

In an embodiment, a background label refiner and paper color estimator 920 may be used to further refine the labeling of background pixels and, in embodiments, to estimate the color of the background of the document 905. In an embodiment, background label refiner and paper color estimator 920 may be the background estimator and label refiner 230 of system 200 and may also include the RGB to CIE Lab component 240. Alternatively, background label refiner and paper color estimator 920 may be a component capable of performing functionality described herein.

In an embodiment, background pixels labeled by component 910 may have no texture patterns in the pixel neighborhood. These pixels may not correspond to paper color of a scanned document. To find true background pixels, histogram-like statistics may be used to identify a dominant background color. In an embodiment, background pixels not corresponding to true background color may be labeled as halftone pixels.

Figure 10:
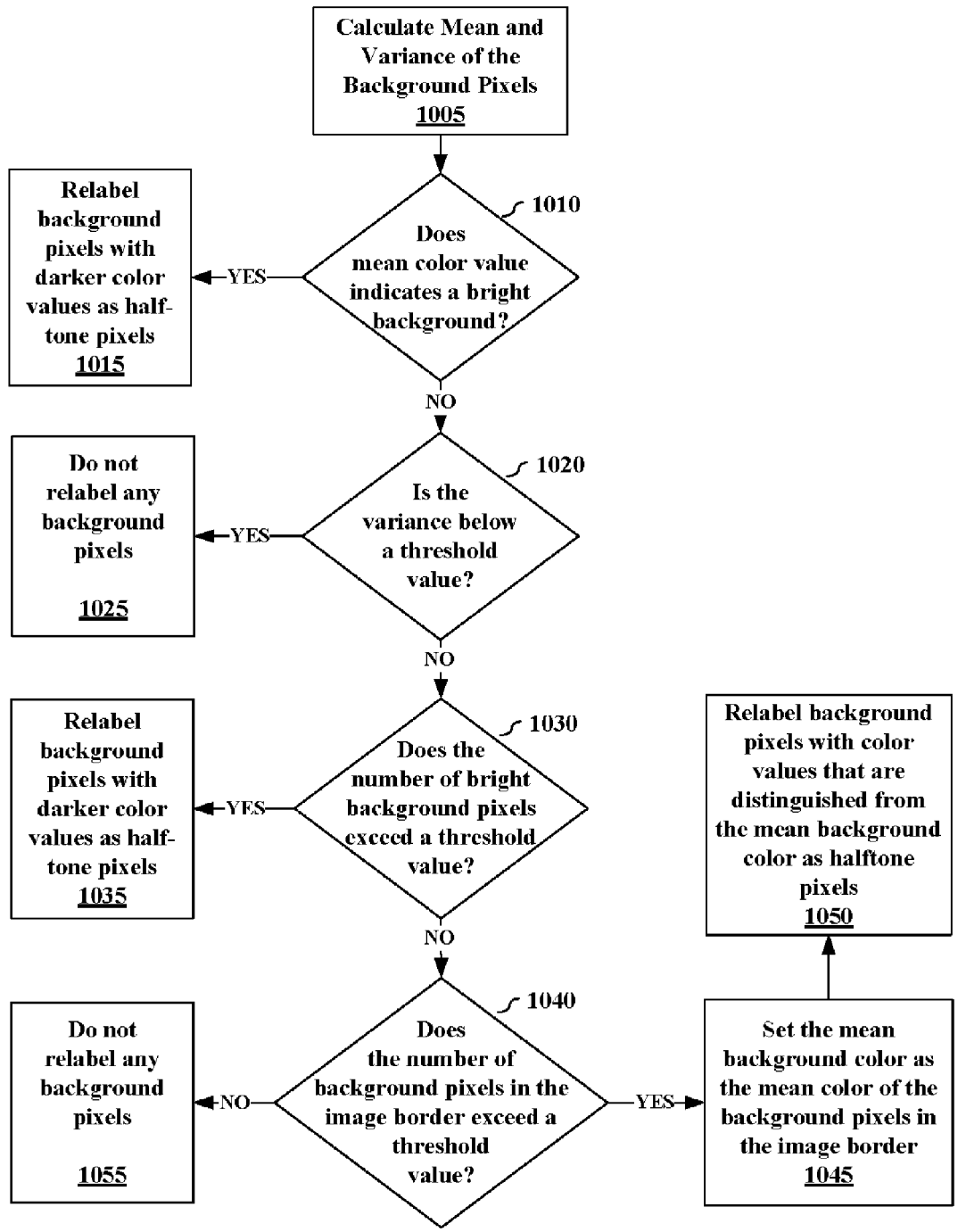
FIG. 10 is a flowchart illustrating a method for refining background pixel labels according to an embodiment of the invention.

FIG. 10 depicts an embodiment of a method for determining a background color according to an embodiment of the present invention, which may be performed by background label refiner and paper color estimator 920. The depicted embodiment begins by computing (1005) the mean and variance of the pixels with a "background" label. If the mean color indicates (1010) an overall bright background, all or some of the background pixels with darker colors may be relabeled (1015) as halftone pixels. If the mean color is not bright and the color variance is below a threshold level (1020), which indicates that the background color is consistent, no background pixels are relabeled (1025). However, if the color variance of the background pixels exceeds a threshold value (1030), a determination is made (1030) if there are a sufficient number of very bright background pixels, such as for example, if their number exceeds a threshold value. If a sufficient number of bright background pixels exists, all or some of the darker background pixels may be relabeled (1035) as halftone pixels. If a sufficient number of bright background pixels do not exist, the image border may be examined. In an embodiment, the image border may comprise the outer region of the image 905. If the image border does not have a sufficient number of background pixels (1040), that is, their number does not exceed a threshold value, then no background pixels are relabeled (1055). If the image border has a sufficient number of background pixels (1040), the mean color of the background pixels in the image border may be set (1045) as the mean background color. Background pixels with color values that are more than a threshold value (1050) from the mean background color may be relabeled as halftone pixels. In an embodiment, a pixel with an unknown label that has a color close to the background color, for example a yellow pixel when the background color is white or close to white, may be labeled as a background pixel if any of its neighbor pixels are background pixels; otherwise, it may be labeled as a halftone pixel. In an embodiment, the mean background color may be regarded as the paper color of the scanned document. For the above presented embodiment, the threshold values/sufficient numbers may the same or different and may be preset or user selected.

d) Background Mask and Edge Mask Generator

In an embodiment, after refining the background labels, high-frequency image noise, such as Moire pattern artifacts, may be removed or reduced by applying a median filter on all pixels except those pixels labeled as edge pixels. In an embodiment, the median filter may be applied to all pixels except those labeled as edge pixels and all pixels within one pixel of an edge pixel.

Based on revised labels, background mask and edge mask generator 925 may generate a background mask and an edge mask of the input image. In an embodiment, the background mask may comprise all revised labeled pixels with a background designation. In an embodiment, the edge mask may comprise all revised labeled pixels that are labeled as halftone edge and non-halftone edge pixels. The edge mask may be dilated in order to perform a reliable color consistency analysis. In an embodiment, the edge mask may be dilated inward to the halftone regions but not into background regions. In embodiments, dilated pixels may be examined to determine whether the pixel should be dilated to an edge pixel. In an embodiment, if a dilated edge pixel is brighter than its original edge pixel, the dilated edge label may be removed and the pixel may be returned to its prior label. By limiting the edge mask dilation to the inward regions, the text in the rendered compressed document is not made thicker than in the original document. The background mask and edge mask may be utilized in subsequent processing.

e) Text-in-Background Extractor

In an embodiment, a text-in-background extractor 930 may classify the pixels of the edge mask into different types according to the types of image blocks or regions with which they are associated. If an edge pixel is on a small image block or on a thin image block, it may be treated as a potential text pixel on background, which may be extracted by the text-in-background extractor 930. Otherwise, in an embodiment, it may be treated as an edge pixel on a potential color-consistent region, such as for example the letter "A" of the "ABC" letters 120 depicted in FIG. 1, which may be extracted by the solid region extractor 940. References herein to classifying pixels as "text," "text in background," "background text," or the like shall be construed to mean pixels in the input image that would benefit from having a higher quality compression in order to preserve a desired level of detail of the pixels, regardless of whether those pixels form legible symbols or any form of lexical mark. Examples of such items that may be classified herein as "text" may include, but are not limited to, alphanumeric characters, lexical marks, symbols, graphics, line art, charts, fine detail items, and the like. The above-mentioned terms may also be used interchangeably with "non-background region" or "non-background region pixels," meaning those pixels that are preferably included in the foreground image layer.

In an embodiment, text-in-background extractor 925 may identify two types of non-background regions by examining the non-background pixels of the background mask. The first type of non-background regions may comprise small-size regions, and the second type of non-background regions may comprise thin lines. In an embodiment, all or a substantial number of surrounding pixels of both of these types of non-background regions may be required to be background pixels.

In an embodiment, small-size regions may be extracted by performing a connected component analysis on non-background pixels, which may include edge pixels and halftone pixels. In an embodiment, a connected component analysis may be performed on the non-background pixels of the background mask. In an embodiment, if the number of pixels in a connected component group of pixels is below a threshold size value and the group of pixels is surrounded or substantially surrounded by background pixels, the group of pixels corresponding to the connected component group may be labeled as a non-background region.

In an embodiment, thin lines may be extracted by examining the pixels labeled as either edge pixels (non-halftone edge or halftone edge) or halftone pixels that may be surrounded or substantially surrounded by background pixels and that meet a threshold size limitation, for example, by fitting within at least one bounding region. Bounding regions may be used to set one or more threshold size values for the connected component groups. A bounding region's size may refer to its pixel area or may be defined by one or more pixel dimensions that form the bounding region (e.g., x pixels by y pixels). The threshold size limitation of a bounding region may also be expressed or measured in units other than pixels.

In an embodiment, thin line regions may be identified by performing a connected component analysis on the non-background pixels of the background mask. In an embodiment, one or more vertical bounding rectangular boxes and one or more horizontal bounding rectangular boxes may be used to identify thin lines that may be labeled as non-background regions. For example, horizontal and vertical sections of the line art 130 in FIG. 1 may be identified as non-background regions using horizontal and vertical bounding boxes. In alternative embodiments, different or additional bounding region configurations may be used.

f) Mode Selection

Embodiments of the document compression system 900 may support one or more modes of processing. In embodiments, the following three different operation modes may be utilized to enhance and compress images based on different document properties. One mode may be referred to as "Photo Mode," which may be utilized for documents dominated with images that are best preserved in high quality. A second mode may be referred to as "Magazine Mode," which may be utilized for documents that mix images and text. A third mode may be referred to as "Text Mode," which may be utilized for documents where text is the most important feature.

In embodiments, a difference between these three modes may lie on the extraction of text or sharp color boundaries on the halftone images. The photo mode may be configured to assume that no text lies on halftone image. The magazine mode may be configured to preserve text lying on halftone image but assumes such text is not highly significant. The text mode may be configured to extract all text regions in the document and to ensure high readability of the extracted text. In embodiments, text on background may be extracted for all three modes.

In the embodiment of a compression system depicted in FIG. 9, system 900 may allow for mode selection 935. In an embodiment, the mode section may be made by a user. Alternatively, the mode selection may be made by system 900 based upon one or more factors about the input image 905, including but not limited to, pixel labels, the amount of text that has been identified, background color, amount of background, color distributions, and the like.

In the depicted embodiment, if the text or magazine modes are selected, the system proceeds to the solid region extractor 940, which may be used to extract halftone text lying on image regions within the image 905. If neither the text nor the magazine modes are selected, the system 900 proceeds to the image layer separator 945. The operation of the solid region extractor 940 and the image layer separator 945 are discussed in more detail below.

g) Solid Regions Extractor

In an embodiment, the solid region extractor 940 may be used to extract solid regions, which may include text lying on regions within an image. In an embodiment, the extraction may be done by finding solid color region in the image document 905. The solid regions may be classified as non-background regions and placed in the foreground image layer.

In an embodiment, solid color regions, such as background text or halftone text, may be determined by a color consistency analysis using edge pixels, where text shall be understood to have the broader meaning as set forth previously. In an embodiment, the color consistency analysis finds color-consistent regions at least partially surrounded by edge pixels using vertical scan lines, horizontal scan lines, or both.

Figure 11:
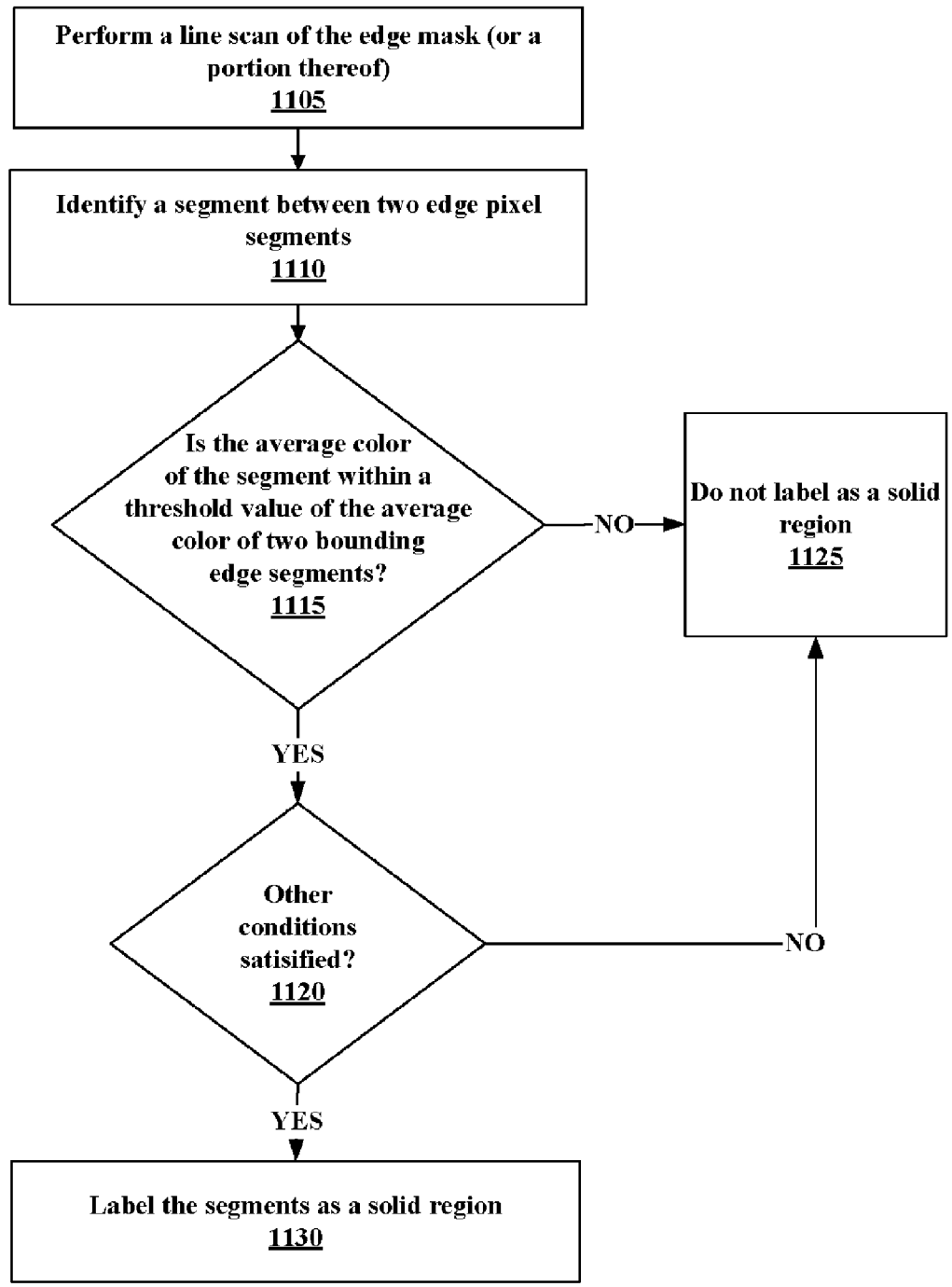
FIG. 11 is a flowchart illustrating a method for identifying text/solid color regions in an image according to an embodiment of the invention.

FIG. 11 depicts an embodiment of a method for performing a color consistency analysis to extract regions, such as text items lying on image regions, in a document 905. A line-by-line scan may be performed (1105) using the edge mask, or a portion thereof. For each line scan, the line segments or regions, if any, are identified (1110) by pixel label type. It shall be noted that a line segment or region may be one or many pixels in size.

Figure 12:
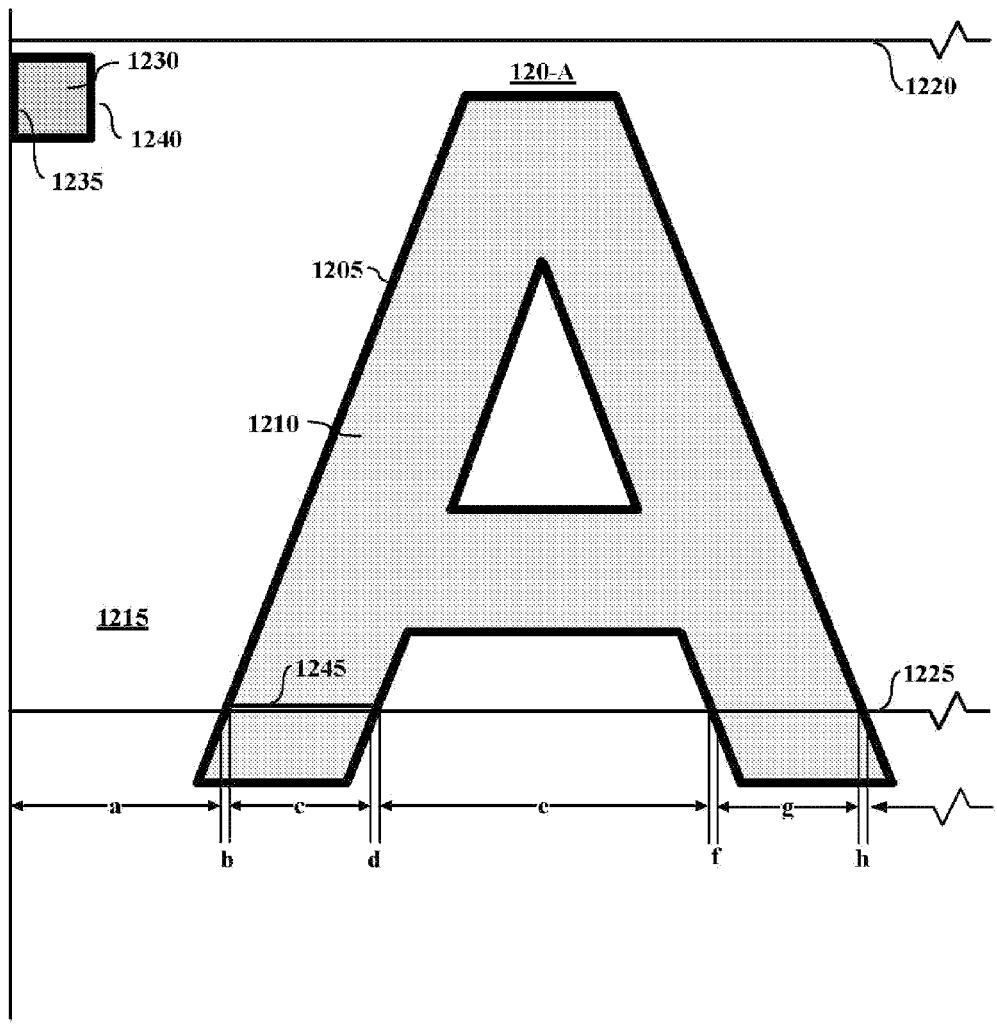
FIG. 12 depicts, for purposes of illustration, a portion of the image document 100 depicted in FIG. 1 and example horizontal line scans, according to an embodiment of the invention.

Consider, by way of illustration, a portion of document 905 depicted in FIG. 12. Illustrated in FIG. 12 are two horizontal line scans 1220, 1225 of a portion of document 905 containing the letter "A." The border 1205 of the letter 120-A represents the dilated edge pixels obtained from the edge mask. The interior pixels 1210 represent halftone or non-halftone pixels. The letter 120-A resides on an image region 1215 that may be background, halftone, or non-halftone pixels. Because line scan 1220 does not intersect any of letter A 120-A, it is a single line segment. Note, however, that line scan 1225 intersects letter A 120-A at several places. The first segment, a, comprises the pixels from the start of the line scan until the start of the edge pixels 1205 of the letter A 120-A. Segments b and d comprise edge pixels of the edge of the letter A 120-A; segment c comprises interior pixels of the letter A 120-A between the two edge pixel boundary segments, b and d; and so forth. A comparison is made (1115) of the segments to identify regions, such as text regions. In an embodiment, the color of segment c may be compared (1115) against the color of segment b with the color of segment d. If the difference in color between segment c and the edge segments b and d is below some threshold level, then the segments may be considered as part of a single solid region and may be classified (1130) as such. If the difference in color between segment c and the edge segments b and d exceeds the threshold level, then the segments are not considered classified (1125) as a solid color region. In an embodiment, the color of the segment bounded by edge pixels, in this case segment c, may be compared against an average of the colors of the two bounding edge pixels segments, segments b and d. If the difference between the values is below a threshold level, as shown in the following formula:

$$\left| c - \frac{b+d}{2} \right| < T_1,$$

the segments may be classified as a solid color region (1130). In an embodiment, the average (mean, median, or mode) color of the segments may be used in the comparison process. In an embodiment, any background pixels that reside along a line segment that has been classified as a solid region may not be classified as solid region but may remain as background pixels.

In an embodiment, the edge labels may be added to all or a portion of the image to avoid artifacts when items, such as text, appears at the image border. Consider, by way of illustration, the region 1230 appearing in FIG. 12, wherein edge pixels 1235 along the image border have been added. In the depiction, the darker exterior indicates pixels labeled as edge pixels and the lighter interior pixels represent halftone pixels. When performing the color consistency analysis, a line scan will identify a line segment through region 1230 as being a solid region, assuming the other conditions are met, because it will be bounded by two edge pixels 1235 and 1240.

In embodiments, additional conditions may be applied (1120) as part of the color consistency analysis. In an embodiment, an additional condition may include examining the neighboring pixels of the immediately preceding line segment. If the neighboring pixels are not substantially edge pixels or are not substantially identified as a solid region during its color consistency analysis, then the line segment may not be identified (1125) as a solid region.

Consider, for purposes of illustration, the following example. Assuming that the segments b, c, and d met the conditions that the difference in color between segment c and the edge segments b and d was below a threshold level, the neighboring pixels to combined line segment b+c+d that were previously examined may be checked to determine if a number exceeding a threshold value of those pixels were also identified as a solid region. For example, assuming the line-by-line scan proceeded from top to bottom, the line segment of pixel neighboring line segment b+c+d would be the pixels directly above, as identified by line 1245 in FIG. 12. In an embodiment, if a threshold number of pixels on line 1245 had been identified as a solid region, line segment b+c+d would also be identified as a solid region; otherwise, line segment b+c+d would not be identified as a solid region.

In an embodiment, the color consistency analysis may also include one or more threshold size restrictions or limitations. For example, if combined line segment b+c+d exceeds a threshold number of pixels, it may also be excluded from being classed as a solid color region. One skilled in the art shall recognize that a threshold size limit may be placed on any combination of the segments or any portion thereof.

In an embodiment, a restriction may be placed on the brightness of pixels that may be classified as a solid region. For example, a set range of light colors may be excluded from being classified as a solid region.

One skilled in the art will recognize that the threshold levels and restrictions, including but not limited to, the maximum color variation, the maximum width, and the brightness of colors of such regions may be configured differently according to a number of factors, including but not limited to the operation mode (text, magazine, or photo) and the type of desired text (background or halftone).

h) Image Layer Separator

In embodiments, the definitions of the background and foreground image layers may differ depending upon the operation mode. In an embodiment, for photo mode, the foreground layer may be defined to comprise all background text and the background layer may be defined to comprise all other pixels in the image 905; and for magazine or text mode, the foreground layer may comprise all background text and solid color regions, and the background layer may comprise all other pixels. It shall be noted that all pixels in the foreground image layer may be referred to as non-background regions, non-background pixels, and/or non-background region pixels. In the embodiment depicted in FIG. 9, image layer separator 945 generates a foreground image layer and a background image layer of the image 905 using the definitions for the selected mode. In an embodiment, a mask is also generated by image layer separator 945.

After separating an entire image document 905 into two layers, the document compression system 900 may perform color interpolation to fill in blank areas in the image layers. Because compression is better if the image layer has consistent color, FIG. 13 depicts an embodiment of a set 1300 of two filters 1310, 1320 that may be applied to a foreground and/or background image layers to fill the image layer. Filter 1310 may be applied to the image layer starting at the top left of the image layer and moving to the bottom right corner. Filter 1320 may be applied to the image layer starting in the bottom right of the image layer and moving to the top left corner. In the depicted embodiment, a filtered pixel value is the average of the selected neighboring pixel values. In an embodiment, for both filters 1310, 1320, if a selected pixel value in the image is unknown (meaning that the pixel value is in the other image layer), the filters 1310, 1320 may ignore those values. In an embodiment, open areas in the background image layer corresponding to background text may be filled with the background color.

i) Layer-based Color Enhancer

In embodiments, layer-based color enhancer 950 may enhance one or more of the layers. In an embodiment, all background text on the foreground layer may be smoothed and color enhanced. In the text mode, solid color regions may also be enhanced.

In embodiments, the color enhancement may be conditionally performed based on local color statistics so that the composite of the two layers has good text readability and also avoids aggressive enhancement for misclassified text pixels. For example, in an embodiment, color enhancement may be performed by darkening text color in order to improve text readability. In one embodiment, for each pixel on the foreground layer, a pixel's color may be replaced with the color of the darkest pixel within a defined neighborhood of the pixel, if the color difference, or intensity gradient, between the pixel and the average of the pixels within the defined neighborhood exceeds a threshold value. In an alternative embodiment, a pixel's color may be replaced with the average color of the pixels in a defined neighborhood if the color difference, or intensity gradient, between the pixel and the average of the pixels within the defined neighborhood exceeds a threshold value. In an embodiment, the defined neighborhood may be a 3×3 kernel.

In embodiments, smoothing may be performed by applying a filtering operation to one or more of the layers. In one embodiment, the filtering operation may comprise setting a pixel value to the average value of the like-labeled pixels within a neighborhood of that pixel. Consider, by way of illustration, an exemplary 3×3 portion of the image mask depicted in FIG. 14, wherein a "0" identifies a pixel labeled as background and a "1" identifies a pixel as having been labeled as foreground. In an embodiment, the center pixel color value, which is a foreground pixel, may be set as the average color value of all foreground pixels within the region of support of the 3×3 filter. In an embodiment, the average value calculation may include the value of the center pixel.

j) Background Color Suppressor

Because the true background color may have been estimated, different levels of background or paper color suppression may be applied by the background color suppressor 955.

In an embodiment, the brightness of the mean background color in Hue-Saturation-Value (HSV) color space may be determined. If the background is not within a light color range, the background may not be suppressed in order to reflect the true background color. In an embodiment, a small background block may not be suppressed.

In an embodiment, in the text mode, big background block may be replaced with white color. In an embodiment, background pixels may be completely replaced with white color if the true background color is bright and close to white color. Such operation removes yellowish color appearance in scanned or camera-captured documents.

In an embodiment, in the magazine mode, background color may be shifted toward white color. In an embodiment, background pixels may be shifted in color halfway toward white color.

k) Layer-based Compression and Composite Generator

In an embodiment, a composite file, such as a portable document format (PDF) file, may be generated as a representation of an input image by stacking the background and foreground layer images using a mask. One skilled in the art will recognize that other composites generators/viewers, other than PDF, may be used to create or view a composite output file 975.

In an embodiment, layer-based compression 960 may compress the background and foreground image layers separately using a compression algorithm. In an embodiment, a JPEG compression with the same or different compression ratios may be used to compress the background and foreground image layers. Because, in embodiments, the two image layers are generated by separating text from background and separating neighboring regions of sharp color changes, both layers can be highly compressed. In particular, since the foreground image layer may consist of smooth and solid color regions, the JPEG quality may be set very low (e.g. 25), but a high-quality composite image is still able to be obtained as an output 975.

Composite generator 965 may used the layers and mask to form a composite document 975. In an embodiment, the high-quality composite of two compressed JPEG image layers (foreground and background) may be achieved by maintaining an image mask that identifies foreground pixels. In embodiments, this mask may be kept intact with lossless compression, such as JBIG2, to minimize file size.

In an embodiment, the foreground and background image layers may be downsampled, such as by a ratio of 3:1, and the mask may be maintained at a ratio of 1:1. In embodiments, system 900, system 1900, system 2400, or each of them may include a downsampler to downsample the foreground and/or background image layers.

Figure 15:
FIG. 15 is an example of an input image document that may be processed according to embodiments of the invention.
Figure 16A:
FIG. 16A depicts an example of a background image layer that may be obtained from the input image according to an embodiment of the invention.
Figure 16B:
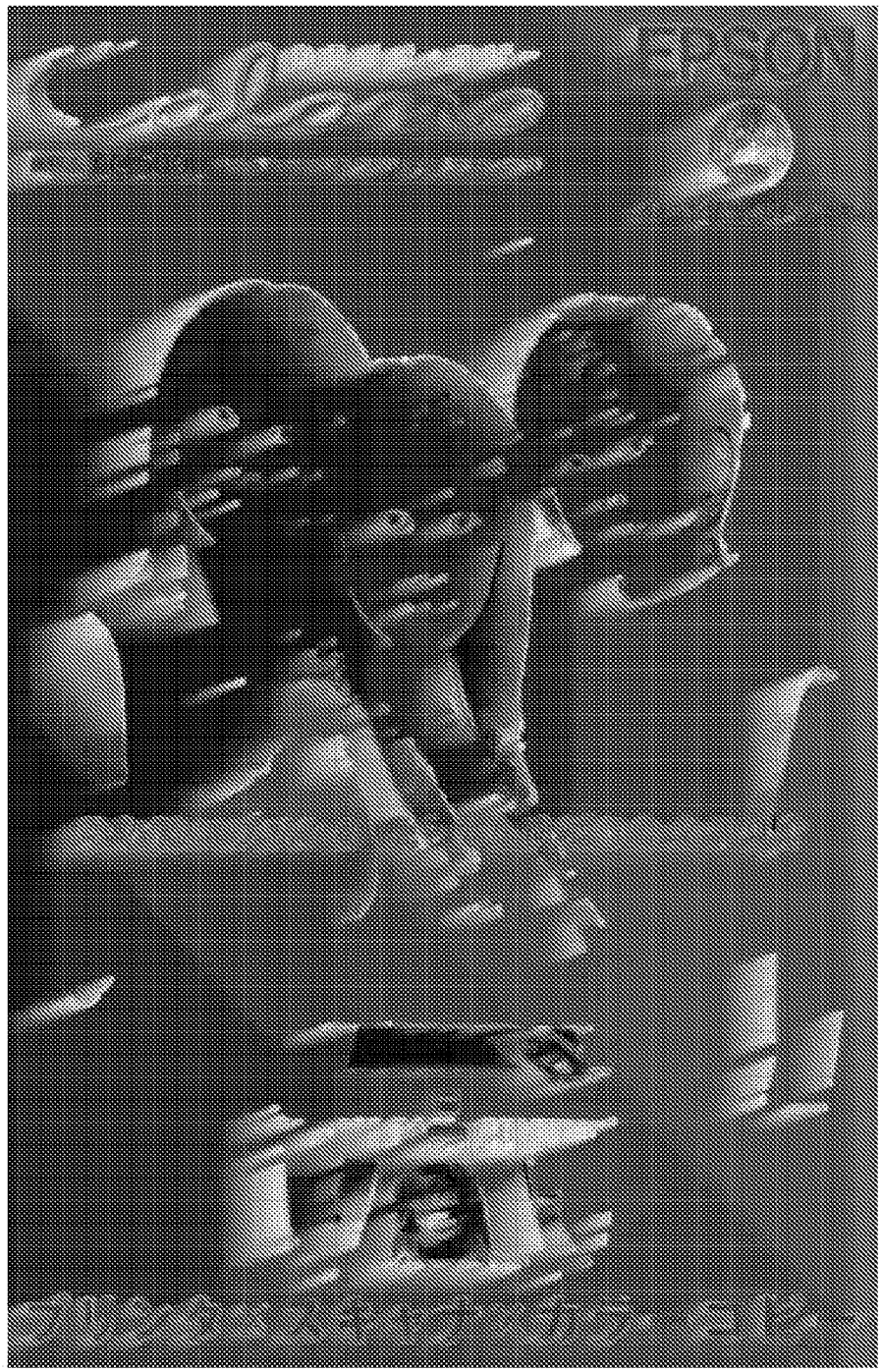
FIG. 16B depicts an example of a foreground image layer that may be obtained from the input image according to an embodiment of the invention.
Figure 17:
FIG. 17 depicts an example of a mask that may be obtained from the input image according to an embodiment of the invention.
Figure 18:
FIG. 18 depicts an example of a composite image, which is a representation of the input image (FIG. 15), that may be obtained from the foreground image layer (FIG. 16A), background image layer (FIG. 16B), and the mask (FIG. 17) according to an embodiment of the invention.

For purposes of illustration, FIGS. 15-18 depict an example of an input image 1500 and the resulting layers used for compressing the input image. FIG. 15 depicts the input image 1500. FIG. 16A depicts the background image layer 1600 for the input image 1500, and FIG. 16B depicts the foreground image layer 1610. FIG. 17 depicts the mask layer 1700. The mask layer indicates which pixels should be selected from the foreground image and which pixels should be selected from the background pixels to generate a composite image. An example of a composite image 1800 is depicted in FIG. 18.

2. Alternative Embodiments of Compression Systems

Figure 19:
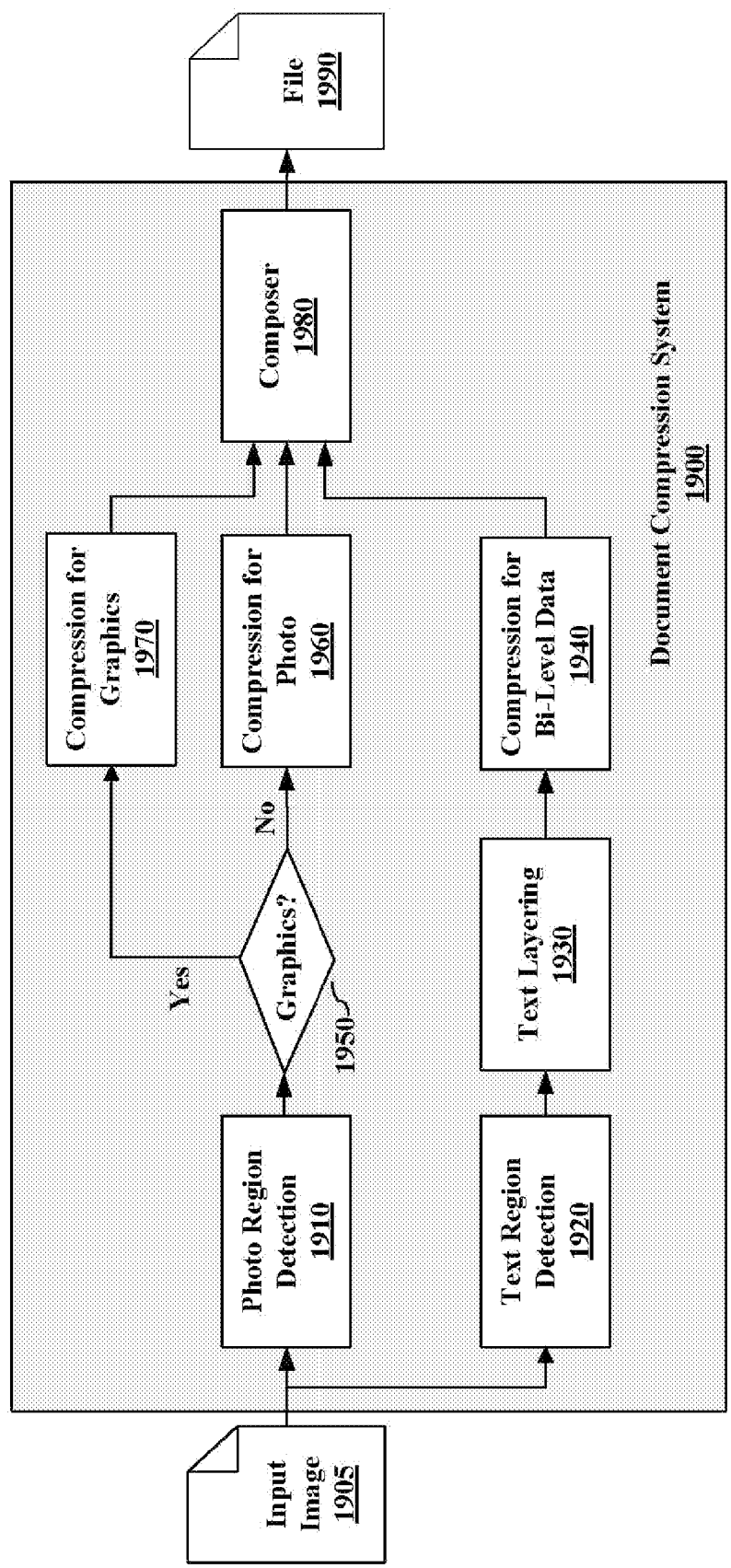
FIG. 19 is a general block diagram of a system for document compression according to an embodiment of the invention.

FIG. 19 depicts an embodiment of an alternative compression system. As noted previously, segmentation is an important factor that impacts the effectiveness of hybrid compression for documents. FIG. 19 presents a flowchart of a hybrid compression scheme with document segmentation for compression an input image 1905. As depicted in FIG. 19, photo regions are initially detected (1910) in the input image 1905. Each photo region may be tested to determine (1950) if it is graphics. If a region is graphics, the data for the region may be compressed (1970) using a graphics compressor. If the region does not contain graphics, the data for the region may be compressed (1960) using a photo compressor.

The input image 1905 may also have texts regions identified and extracted (1920) from the input document 1905. Each layer of text (according to color) (1930) may be compressed by a bi-level data compressor (1940). The compressed data are composed (1980) for display, transmission, and/or storage. Components for system 1900 shall be described in more detail below.

a) Photo Region Detection

Figure 20:
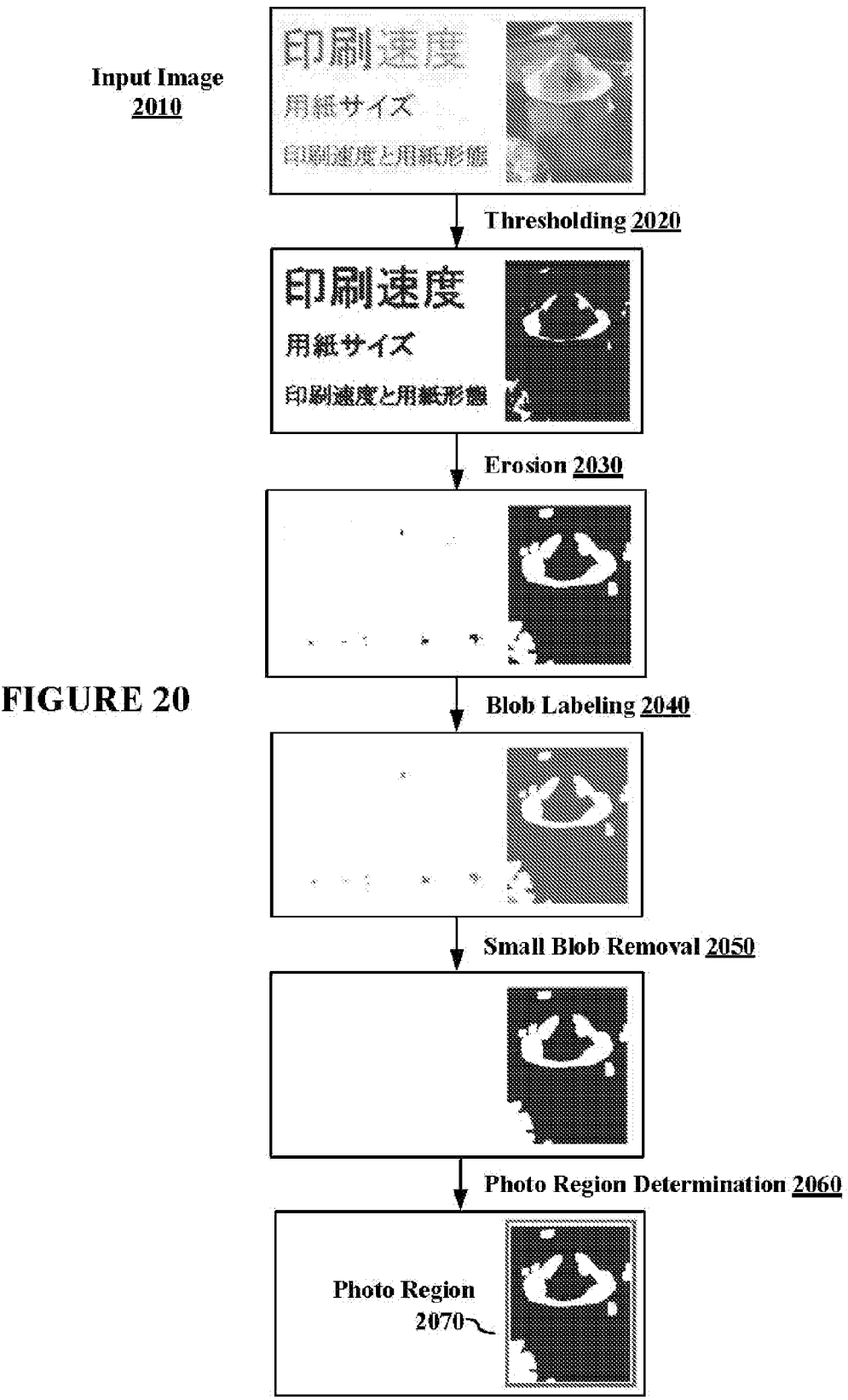
FIG. 20 is a flowchart illustrating a method for photo-region detection according to an embodiment of the invention.

FIG. 20 illustrates an exemplary workflow of an embodiment of a photo region detection algorithm. As illustrated in FIG. 20, an input image 2010 may be thresholded (2020) by a background color. In embodiments, the background color may be assumed to be a light background. In an embodiment, if a pixel value is lighter than the background color, it is assigned as background; otherwise, it is foreground. A morphological erosion 2030 is operated on the background/foreground mask to remove text pixels. In an embodiment, the size of filter performing the morphological erosion is bigger or equal to the thickness of the largest text that is desired to be removed. In an embodiment in which the input image 2010 is a 300-dpi scanned image, the filter may be 9×9.

Each cluster or group of pixels, or blob, in the background/foreground mask may be labeled (2040). Each blob that possesses a number of foreground pixels that is smaller than a threshold value may be removed (2050). The remaining blobs may be classified as photo blocks (2060). A bounding box 2070 may be determined for each region. In an embodiment, the bounding box may be set as the smallest box that encompasses a blob. One skilled in the art will recognize that the erosion (2030) shrinks each blob by half the filter size on each side; hence, in an embodiment, the final bounding box may be expanded by at least half the filter size on each side.

Figure 21A:
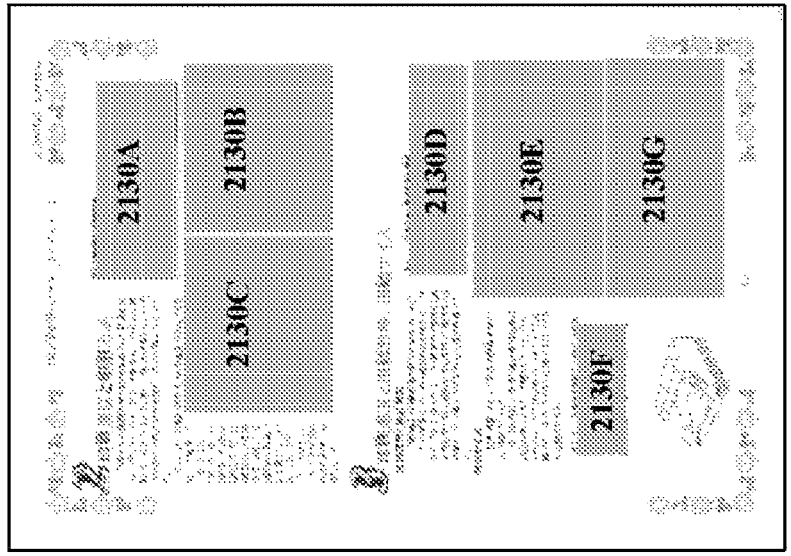
FIG. 21A depicts an example of an input document according to an embodiment of the invention.
Figure 21B:
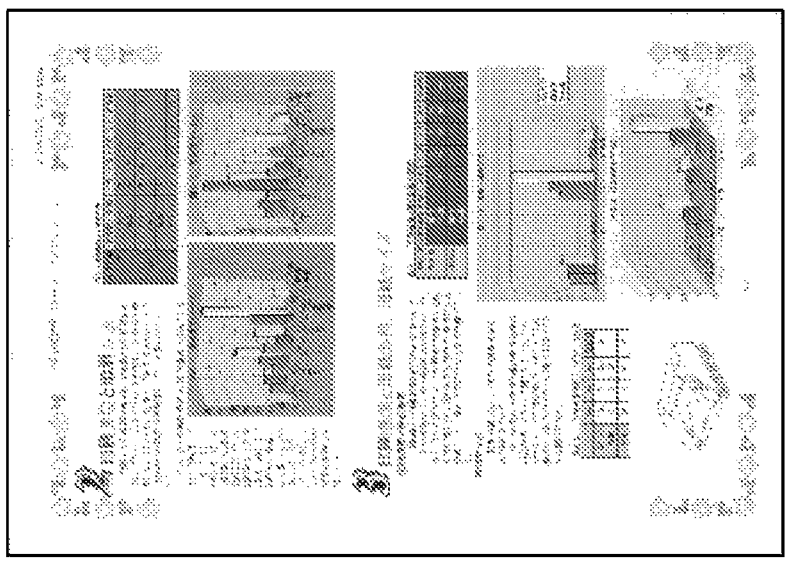
FIG. 21B depicts the input document of FIG. 21A with photo regions detected according to one embodiment of the invention.

For purposes of illustration, FIG. 21A shows an exemplary input image 2110, and FIG. 21B illustrates the result 2120 after photo detection 1910 has been performed. The gray areas 2130A-2130G in the resultant image 2120 represent the detected photo blocks.

b) Graphics Region Determination

Typically graphics and line art images contain high-contrast. Because images will have high-contrast, these regions will contain many edge pixels. Furthermore, these regions also typically have limited numbers of colors. In an embodiment, a block may be classified as a graphics block if it meet two criteria. The first criterion may be that the number of edge pixels in the entire region must exceed a threshold value. In an embodiment, the threshold value may be ten percent. The second criterion may be that the dominant color or colors in the edge region are also dominant in the entire region. In an embodiment, a dominant color in the edge region may be defined as the occurrence of that color that exceeds a certain percentage threshold. In an embodiment, the percentage threshold may be five percent, where the 24-bit color space is quantized into 256 bins, that is, 3 bits for red, 3 bits for green, and 2 bits for blue. In an embodiment, the total occurrence of those dominant colors in the entire region may also be required to exceed a threshold value. In an embodiment, the threshold value may be 60 percent.

c) Text Mask Extraction

Figure 22:
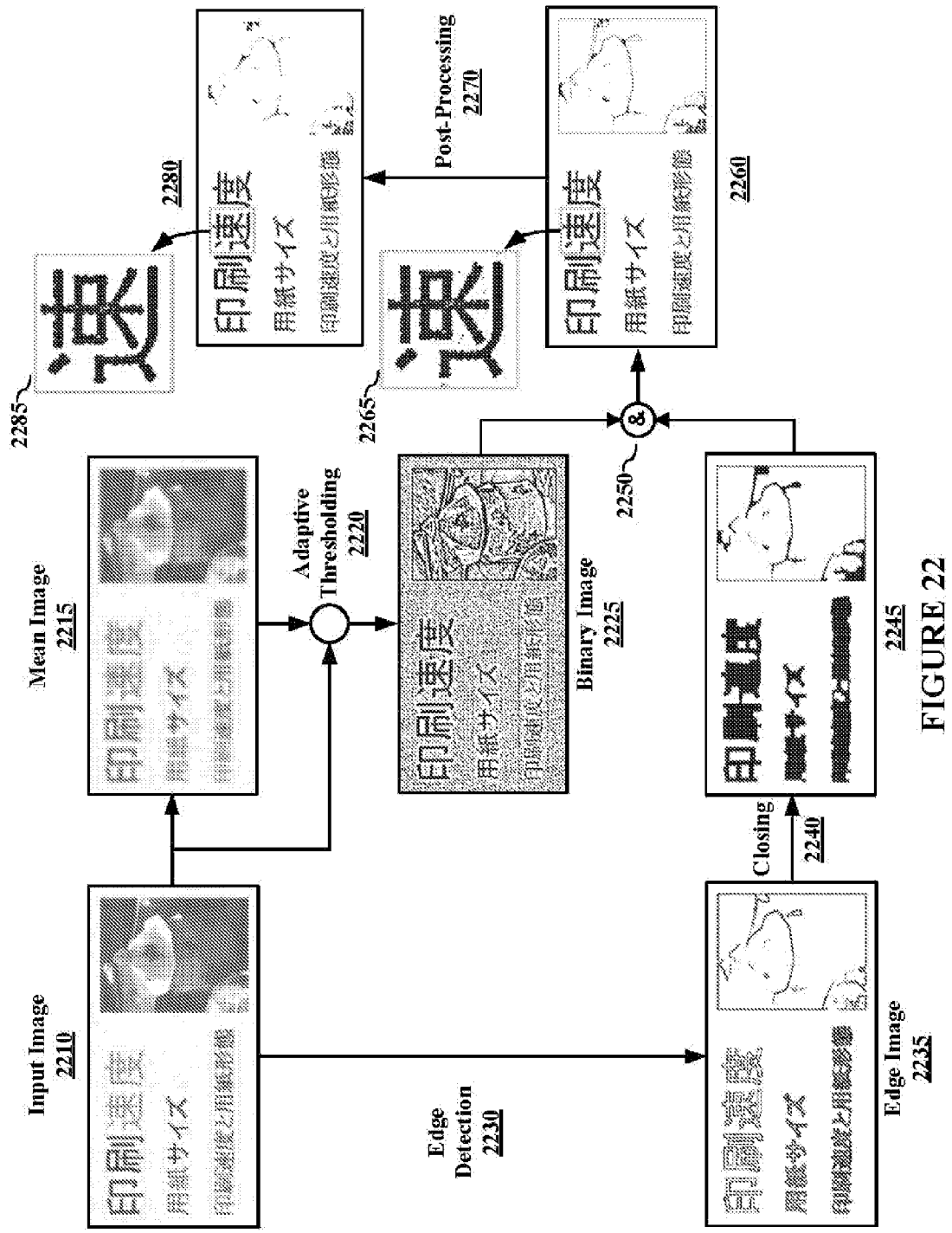
FIG. 22 illustrates a method for text mask extraction according to an embodiment of the invention.

FIG. 22 depicts an embodiment of an algorithm to extract text from an input document 2210. For purposes of illustration, the depicted embodiment was performs on a grayscale image; however, one skilled in the art shall recognize that the process may also be applied to each component of a color image. In an embodiment, with a logical operation, such as OR, on the mask of each component color, a final text mask may be generated.

In the depicted embodiment, a color image (not shown) was first converted to a grayscale image 2210. A mean image 2215 may be calculated from the grayscale image, wherein at each pixel location, the mean of a small block is computed. In an embodiment, a reasonable block size may be 7×7. The mean image 2215 may serve as the threshold 2220 for binarizing the original gray image 2210 to obtain a binarized image 2225.

An edge detection operation 2230 may also be performed on the original image 2210. In an embodiment, the edge detection 2230 may be performed using sobel filtering and thresholding. The edge image 2235 obtained from the edge detection 2230 operation may undergo a morphological closing operation 2240 to fill the gaps in the text region. Image 2245 illustrates the filled-in text portions of the edge image 2235. In an embodiment, the size of the filter is greater or equal to the thinness of text to be extracted. In an embodiment, the filter may be the same as the one used in the photo region detection, which was discussed in the previous section. In one embodiment, a reasonable sized filter may be 9×9 for 300 dpi scanned data.

In an embodiment, the binary image 2225 may be combined (2250) with the edge mask 2245. By combining the binarized image 2225 and the edge mask 2245 with the logical AND operation, a text mask 2260 may be created. For purposes of illustration, depicted in FIG. 22 is an exploded view of a text character 2265 from the text mask 2260. Note that some small artifacts or dots appear. In an embodiment, the text mask 2260 may be improved by performing post-processing, such as, removing small isolated dots. Depicted in FIG. 22 is a post-processed text mask 2280. Also shown is an exploded view of the text character 2285 following the post-processing, wherein small isolated dots have been removed to improve the quality of the image.

d) Text Layering by Color

Figure 23:
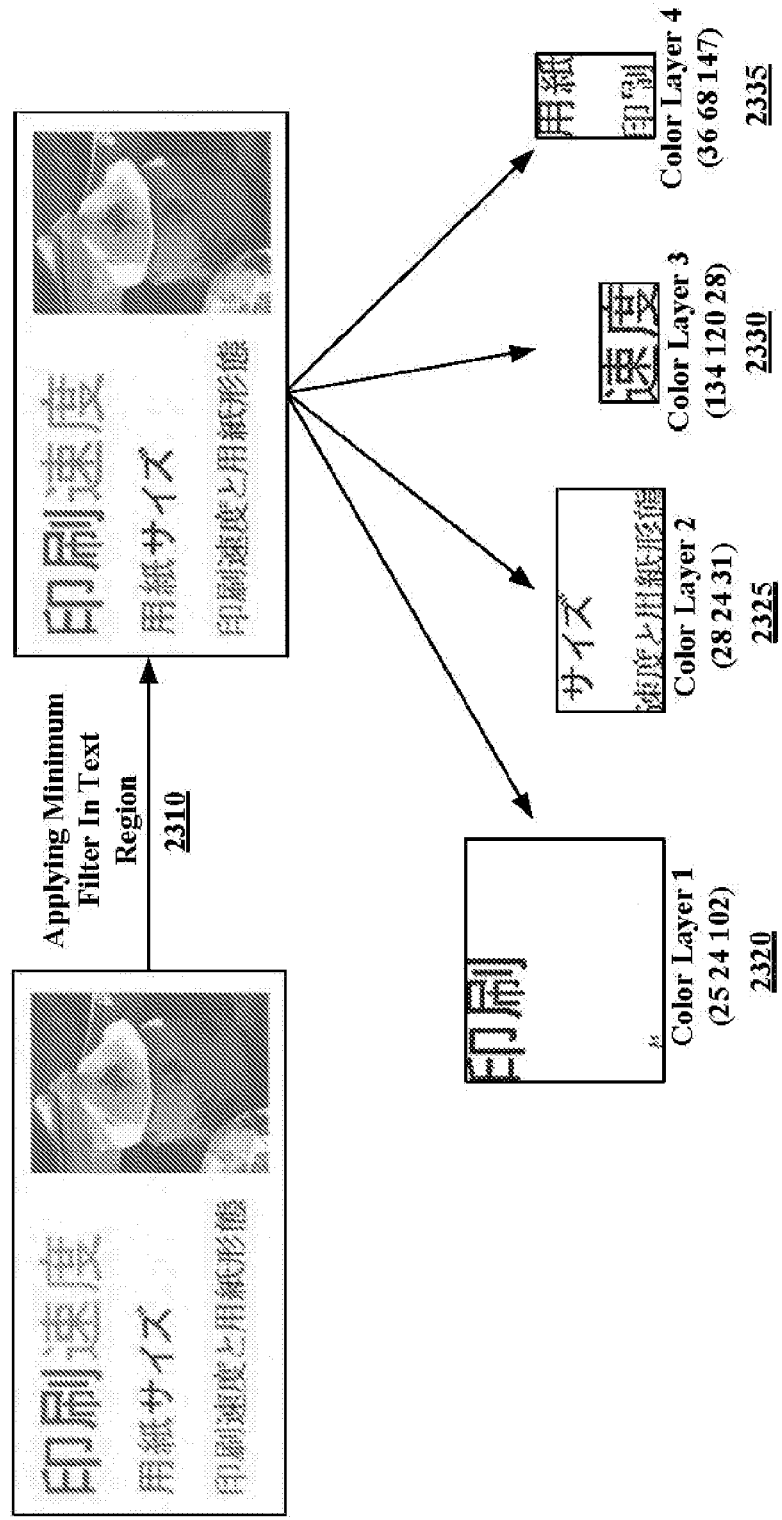
FIG. 23 illustrates a method for text layering by color according to an embodiment of the invention.

In embodiments, text layering by color may be performed following the text region extraction. FIG. 23 illustrates an embodiment of a flowchart of text layering by color. To improve the performance, a minimum filter may be applied (2310) in the text region. In embodiments, the size of filter may range from 3×3 to 7×7. In an embodiment, texts may be assumed to have lower intensity.

After applying filtering, the colors in the text region are more consistent. The colors may then be clustered, and a layer may be assigned to each color. As illustrated in the example depicted in FIG. 23, the text comprises four different color groups, and accordingly, four different color layers 2320-2335 may be created. It should be noted that in embodiments, in color quantization or clustering, a fixed number of colors may be generated initially. Two colors may be merged if the distance between the two colors is less than a threshold value. Such embodiments can assist in limiting the number of color layers.

3. Alternative Embodiments of Document Compression

In the previous approach, a document is segmented into background layer and text layer. The text layer is further split into different layers depending on colors. Each text layer (for each color) may be compressed by, for example, CCITT Group ¾ Fax Standard. The background layer may be compressed by, for example, JPEG.

In an alternative embodiment, colors for text may be explicitly quantized. However, sometimes the number of colors is hard to control. If there are too many colors, file size can increase dramatically because each color layer is coded separately. If there are too few colors, color fidelity may be lost.

Because viewers, such as Adobe Portable Document Format (PDF), support softmasking, an input document may be separate into three images or layer: text mask, an alpha image which contains color information for text, and a background image which excludes text regions. The text mask may be bi-level and may be compressed by standard bi-level compression algorithms such as CCITT Group ¾ Fax or JBIG. One skilled in the art shall recognize that those algorithms are lossless. The background image and the alpha image may be compressed by a compression algorithm, such as JPEG, at lower resolutions. It should be noted that generating smooth background image and alpha image promote efficient compression.

Figure 24:
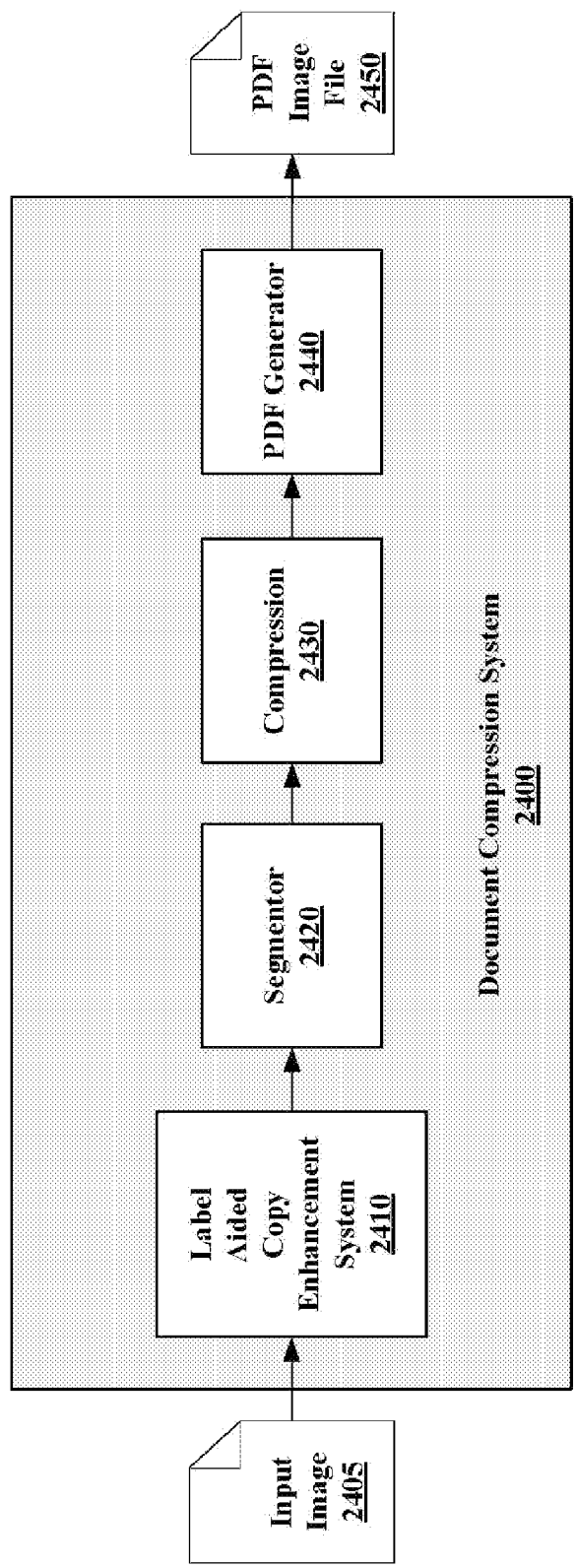
FIG. 24 is a general block diagram of a system for document compression according to an embodiment of the invention.

FIG. 24 depicts an example of a document compression pipeline 2400 according to an embodiment. As illustrated in FIG. 24, an input image 2405 is received by a label aided copy enhancement system 2410 that generates an enhanced image, a background-color label, and an X-label. The X-label identifies or classifies each pixel with a label, which label may be selected from a group comprising, but not limited to, such labels as edge, halftone edge, halftone, or other. In an embodiment, the label aided copy enhancement system may be system 200. In an alternative embodiment, label aided copy enhancement system 2410 may be a portion of the system 200. Alternatively, other substitutes besides system 200 or a portion of system 200 may be used to generate similar results. The segmentation module, segmentor 2420, receives the information generated by the label aided copy enhancement system 2410 and generates a text mask, a background image, and an alpha image (which contains color information for text). Compression module 2430 selects and applies a compression method for each layer/image according to the content. Finally, PDF generator 2440 wrap the compressed data received from the compression module 2430 and creates a PDF file 2450.

Described in more detail below are segmentation techniques to separate text from background by utilizing results from the label aided copy enhancement system 2410, and generate a smooth background image and alpha image. In an embodiment, the segmentation includes two parts: one is text and background separation and the other is background image and alpha image generation.

a) Text and Background Separation

Figure 25A:
Figure 25B:
Figure 25C:

FIGS. 25A-C show an exemplary output from label aided copy enhancement system 2410. FIG. 25A depicts an enhanced image 2510 of an input image. FIG. 25B depicts a background-color label 2520, which measures the distance to background color. FIG. 25C represents the pixel X-labels 2530, which is the identification or label of each pixel in which the pixels have been labeled, such as edge, halftone edge, halftone, or other.

b) Initial Text Mask

From the X-label pixel information, edges, including in an embodiment, halftone edges, may be extracted. In an embodiment, the edge regions may be dilated. Preferably, the size of the filter is sufficiently large to fill the gap between edges in text region. In an embodiment, a reasonable size for the filter may be 9×9.

A mean image may be calculated to serve as a threshold for binarizing the image. In an embodiment, the mean image may be calculated by calculating a local mean at each pixel. By way of illustration, at 300 dpi, a reasonable block size for computing local mean may be 9×9. As noted previously, this mean image serves as threshold for binarizing the image whereby a pixel in the dilated edge region may be compared with the local mean. An initial text mask may be extracted thereby using this adaptive thresholding.

Figure 26:
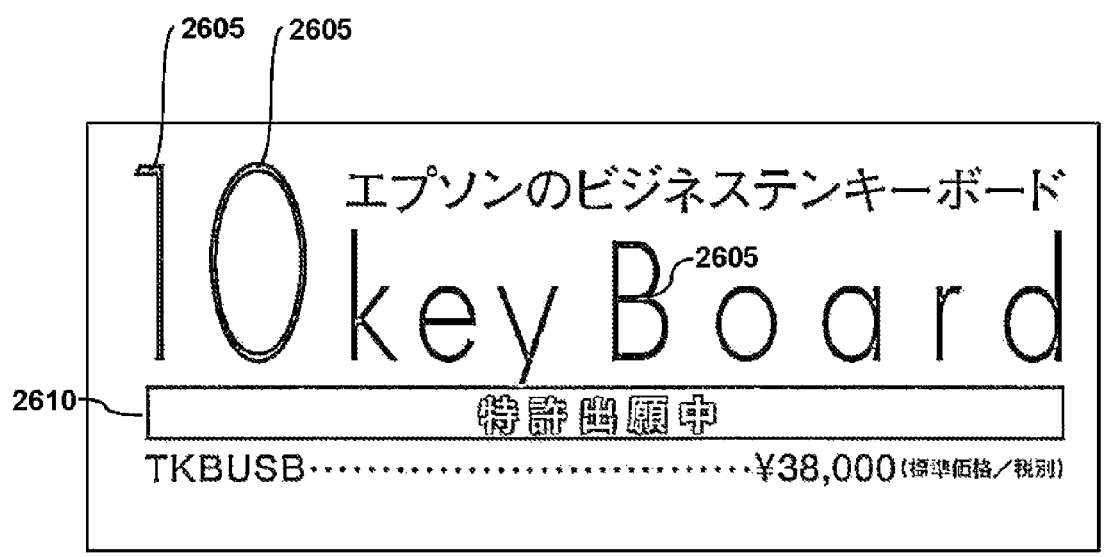
FIG. 26 depicts an example of an initial text mask according to an embodiment of the invention.

It should be noted that scanned document are typically noisy. To improve the situation, in an embodiment, a low-pass version of the original image may be used instead of the original image. In this stage, the text mask may be improved by removing the small isolated text pixels (due to noisy scan). FIG. 26 depicts an example of initial text mask 2600.

c) Saturated Constant-Tone Region

As seen on FIG. 26, gaps 2605 occur in some of large text. Also, it should be noted that in the depicted embodiment only the boundary of the solid bar 2610, which was a magenta color in the input image, is extracted and the remaining portion is labeled as background in the initial mask 2600. This configuration may create annoying coloring artifacts when it is next to white background. In an embodiment, to circumvent the problem, solid and saturated constant-tone region may be extracted and labeled as text region.

Figure 27:
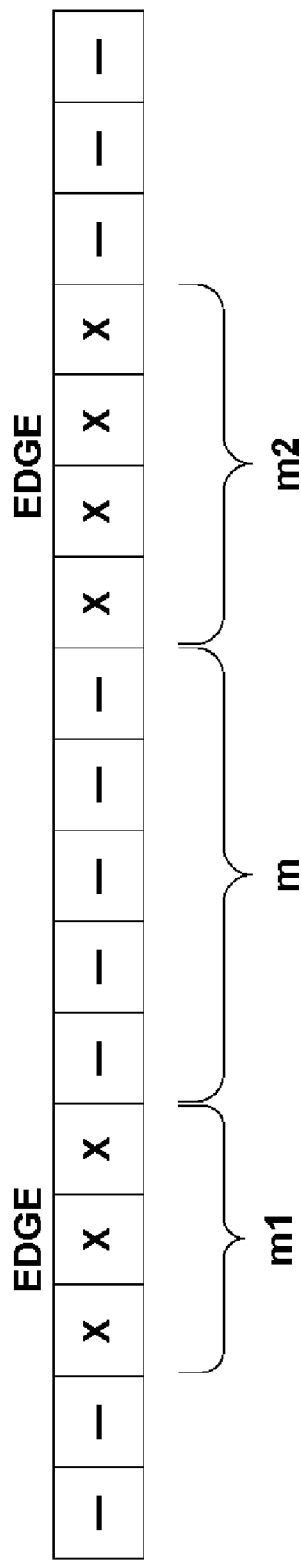
FIG. 27 illustrates an example from a method for identifying potential constant-tone regions according to one embodiment of the invention.

In an embodiment, to extract solid and saturated region, potential regions are determined. In an embodiment, a potential region may be defined as a region bounded by edge or text pixels and the intensity in between edges is similar to those edge pixels. FIG. 27 illustrates a method to identify potential constant-tone region. In FIG. 27, "×" represents an edge pixel and "−" represents a background pixel. m1 and m2 represent the mean values for edge regions, and m represents the mean value for the region in between the two edge regions. If m1 and m2 are within a first threshold value, and m is within a second threshold value to m1 and m2, then that region may be labeled as a potential region. In embodiment, the first and second threshold values may be the same or may be different. This process of identifying potential regions may be applied in both horizontal and vertical directions.

Figure 28:
FIG. 28 depicts an example of a text mask after constant-tone detection according to an embodiment of the invention.

In the potential regions, in an embodiment, color saturation and local variance may be computed for each pixels. Color saturation S(x, y) may be defined as:

$$S(x, y) = 1 - \frac{\min(R(x, y), G(x, y), B(x, y)) \times 3}{R(x, y), G(x, y), B(x, y)},$$

where R(x, y), G(x, y), and B(x, y) represent the red, green, and blue values, respectively, at location (x, y). In an embodiment, if color saturation is greater than a threshold value and the variance is less than another threshold value in a potential region, the pixel may be labeled as solid constant-tone pixel or treated as a text pixel. FIG. 28 represents a text mask 2800 following solid constant-tone detection using the text mask 2600 from FIG. 26 as an input. It should be noted that the gaps 2605 in some large text characters have been filled using the solid constant-tone detection.

d) Text Thinning

In boundary of text region, many transition pixels may be labeled as text; hence, the text may appear thick as shown in FIG. 29B as compared to the input image 2910 depicted FIG. 29A. In an embodiment in which thin text is preferred, thinning may be applied in the boundary region. Near text boundary, a local mean intensity for background pixels and local mean intensity for text may be computed. If the intensity of a background pixel is closer to the mean intensity of nearby text, it may be labeled as text; or, if the intensity of a text pixel is closer to the mean intensity of nearby background, it may be switched to background pixel. FIG. 29C illustrates an embodiment of a text mask 2930 obtained after thinning.

e) Color Text Enhancement

In embodiments, particularly when the input image is a scanned document, sharp text edges may be blurred and text may be noisy. To improve contrast and compression efficiency, enhancement may be performed in the text boundary. In an embodiment in which it is assumed that the background is lighter than text, a background pixel which is near a text pixel may take the value of a nearby background pixel that has the lightest intensity. A boundary text pixel may take the value of a neighboring text pixel that has the darkest intensity. For example, in an embodiment, all background pixels in a region near a text pixel or pixels may be set to the lightest background pixel color in that region. And, in the embodiment, text pixels in a region may be set to the darkest pixel color in that region. In an embodiment, low-pass filtering may be applied within text region.

f) Text on Background-Color Region

Figure 30A:
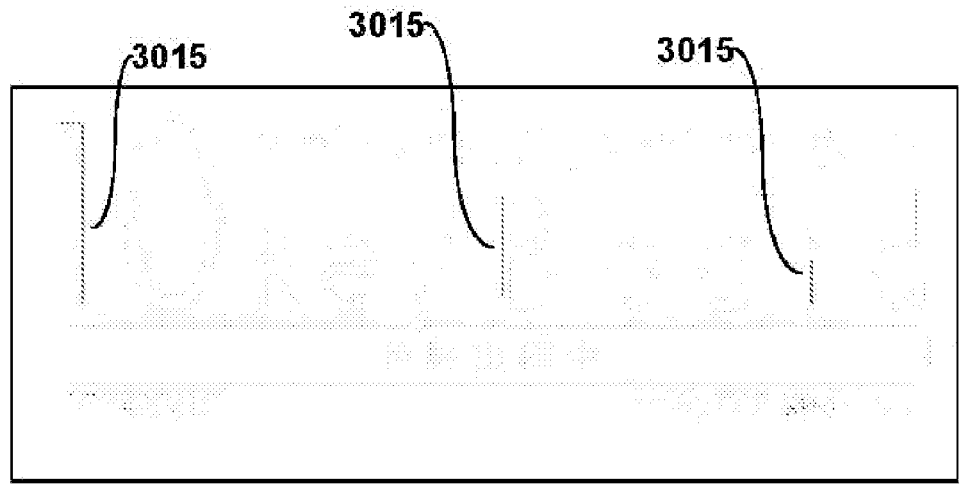
FIGS. 30A and 30B illustrate, respectively, examples of a background image after removing text and of a background image after fill-in and smoothing according to an embodiment of the invention.

Text on a halftone region is typically difficult to extract, and many annoying artifacts may occur after compression. In embodiments, the text mask may contain the text pixels on background-color region or non-halftone region only. In an embodiment, to identify those pixels, halftone pixels may be excluded from the background-color mask. The modified background-color mask may then be eroded and text regions blob-labeled. If a text blob is overlapped with background color pixel, the entire text blob may be identified as text on background-color region.

g) Background Image and Alpha Image Generation (i) Generating a Background Image FIG. 30A represents a background image after removing text pixels. Note that there are sharp edges, for example edges 3015 (which have been slightly exaggerated for purposes of illustration), at the text boundary after the removing process. It should be noted that the edges may not be obvious, as in this particular image 3010, because the background color is light, and the removed text pixels are replaced by white. Compression algorithms like JPEG are not highly effective for images with sharp edges. To improve efficiency, in an embodiment, the text pixels may be replaced with values from their neighborhood.

Figure 31:
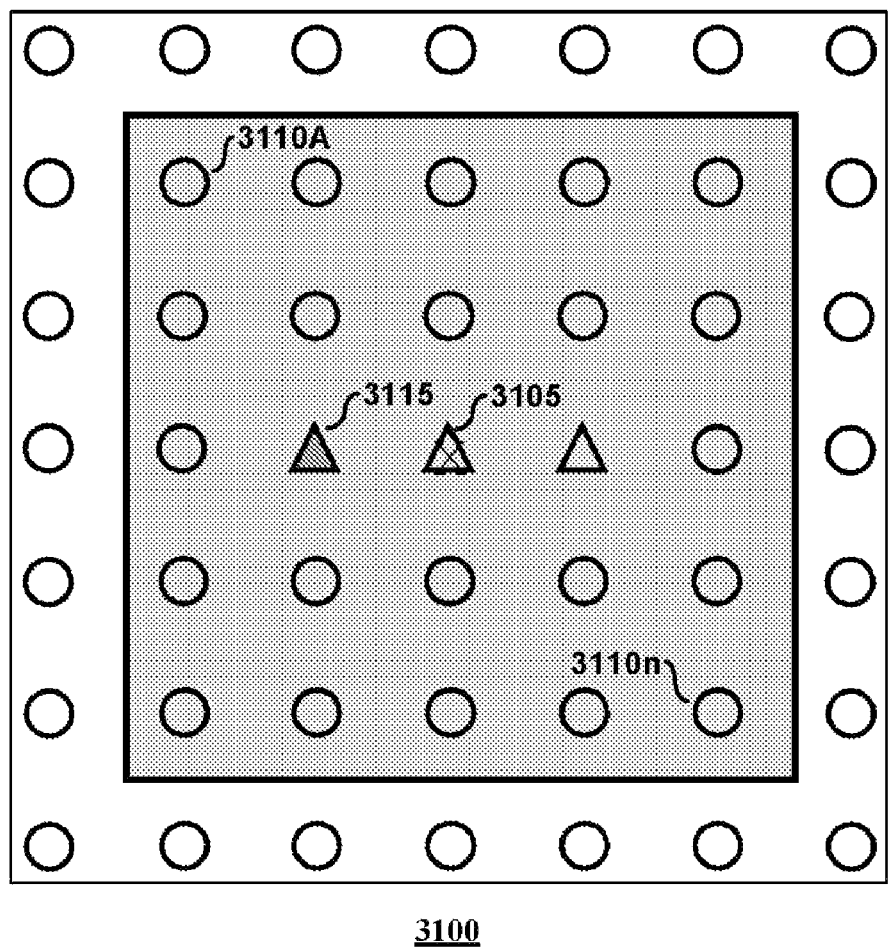
FIG. 31 illustrates an example of a method for replacing text pixel according to an embodiment of the invention.

To further improve the smoothness of a background image, the background pixels near text pixels may be replaced with their local means before fill-in of the text pixels because when a document is scanned there are typically some transitional pixels around sharp edges. In an embodiment, as illustrated in FIG. 31, to fill a text pixel 3105, the mean of neighboring background pixels 3110A-n and previously filled pixels 3115 may be calculated. In FIG. 31, a circle represents a background pixel 3110, a triangle represents a text pixel, and a shaded triangle 3115 represents a previously filled text pixel.

Figure 30B:

FIG. 30B depicts a background image 3020 after fill-in of the background image 3010 in FIG. 30A. Note that the sharp edges have been removed or smoothed.

(ii) Generating an Alpha Image

Figure 32A:
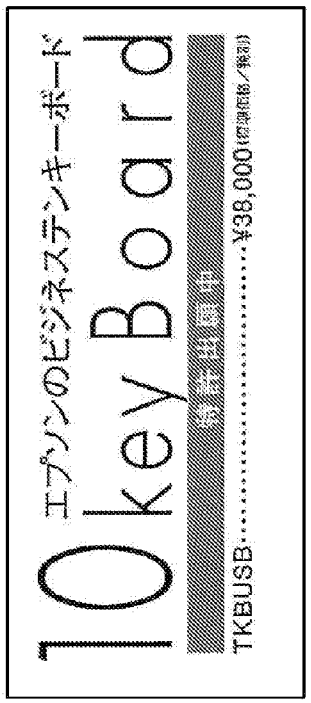

FIG. 32A depicts an initial alpha image 3210. This image 3210 is the result of removing background pixels. When JPEG compression is used, the file size can be large or have severe artifacts in text region because there are a lot of edges. Edges require large amount of bits to code. Since the text mask will lay on top of the alpha image or alpha image appears through the mask, the data in the white areas of FIG. 32A will not show up in the final result. Thus, the data in those areas may be replaced to create a smoother image to achieve high compression.

Figure 32B:
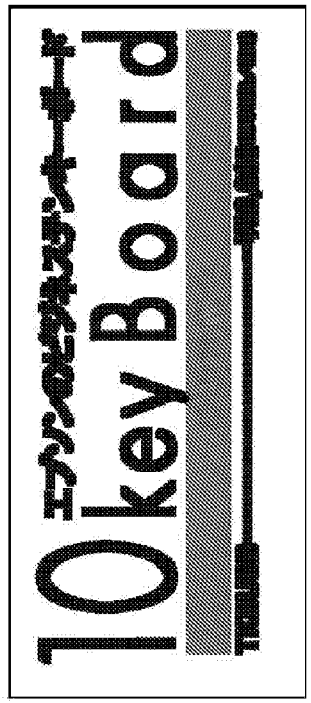

The alpha image is typically downsampled to a lower resolution for efficient compression because it is a low-variant image after proper fill-in in the background. In an embodiment, to ensure pixel values around the text boundaries have the similar values as original after the downsampling and upsampling processes, the text boundary may be expanded or dilated such as shown in FIG. 32B.

Figure 32C:
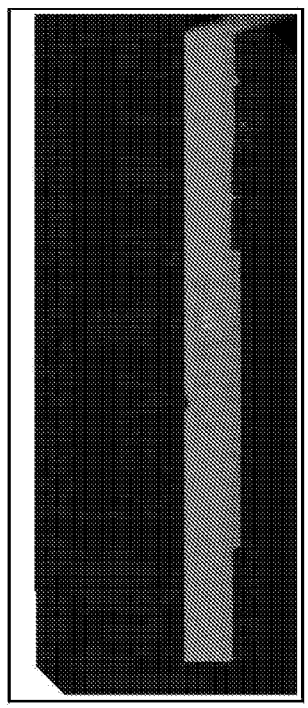
Figure 32D:
Figure 33:
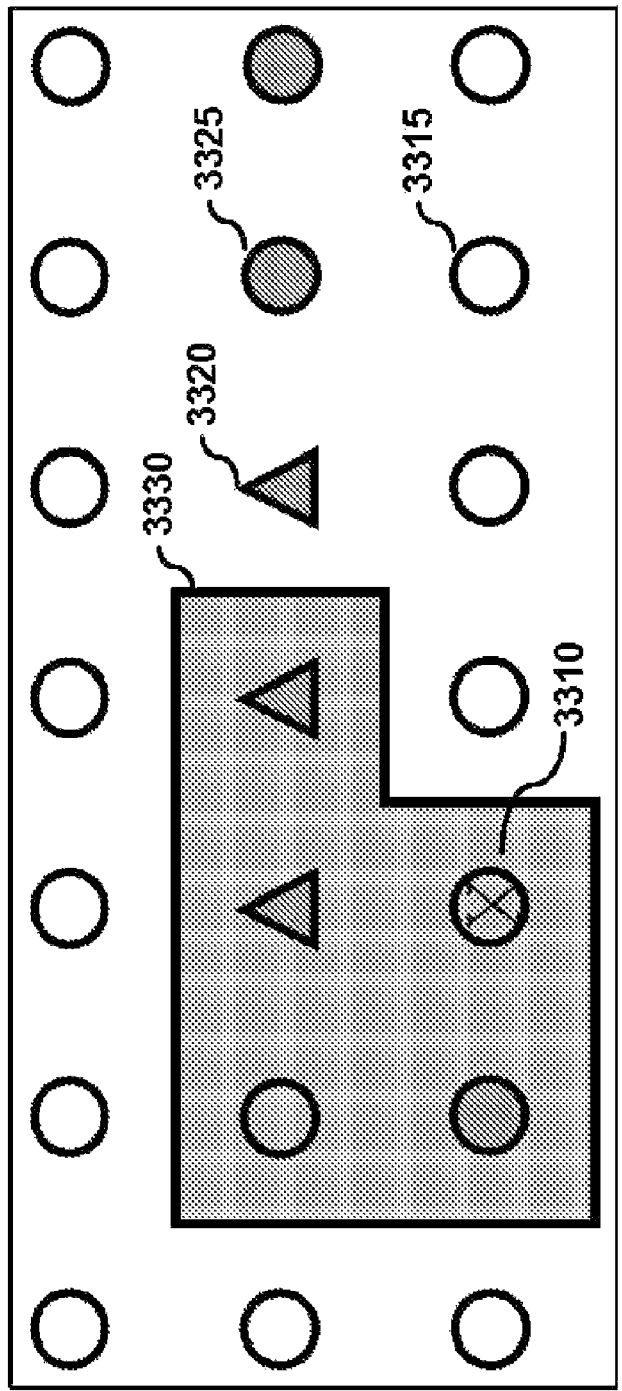
FIG. 33 illustrates an example of a method for fill-in for background region according to an embodiment of the invention.

FIG. 33 illustrates an embodiment of a fill-in process for the background region. In the depicted illustration in FIG. 33, an empty circle (for example, circle 3315) represents a background pixel; a triangle (for example, triangle 3320) represents a text pixel; and a shaded circle (for example, circle 3325) represents a filled background pixel. A background pixel 3310 may be filled with the mean of the text pixels and the previously filled background in its neighborhood (shaded area 3330). FIG. 32C depicts the result after fill from top to bottom and left to right, and FIG. 32D depicts the result after fill from bottom to top and right to left.

Aspects of the present invention may be implemented in any device or system capable of processing the image data, including without limitation, a general-purpose computer and a specific computer intended for graphics processing. The present invention may also be implemented into other devices and systems, including without limitation, a digital camera, a printer, a scanner, a printer, a facsimile machine, a multimedia device, and any other device that processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for compressing an image comprising pixels, the method comprising:
   identifying edge pixels using gradient pixels identified in a plurality of pixels selected from the image, in a first low-pass filtered set of the plurality of pixels, and in a second low-pass filtered set of the plurality of pixels;
   determining an edge pixel type for each of the identified edge pixels;
   using at least some of the identified edge pixels to label each pixel of the plurality of pixels;
   using the labeled pixels to identify non-background region pixels;
   generating a foreground image layer comprising the non-background region pixels;
   generating a background image layer comprising pixels with a background label;
   generating a mask layer that identifies from which of the foreground and background image layers a pixel should be selected when generating a representation of the plurality of pixels; and
   compressing the mask layer differently than at least one of the foreground and background image layers.

2. The method of claim 1 further comprising the step of:
   responsive to estimating a background color, relabeling the label associated with at least one pixel.

3. The method of claim 1 wherein the step of using the labeled pixels to identify non-background region pixels comprises the steps of:
   using the pixel labels to generate a background mask comprising pixels from the plurality of pixels with a background label; and
   performing a connected component analysis on non-background pixels of the background mask and responsive to a connected component group of non-background pixels being below a threshold size, selecting pixels corresponding to the connected component group as non-background region pixels.

4. The method of claim 3 wherein the threshold size of the connect component group refers to the number of pixels of the connect component group or to a size of a region that bounds the connect component group.

5. The method of claim 1 wherein the step of using the labeled pixels to identify non-background region pixels comprises the steps of:
   generating an edge mask comprising pixels labeled as edge pixels;
   using at least some of the labeled pixels and the edge mask to identify solid region pixels; and
   including the solid region pixels as non-background pixels in the foreground image layer.

6. The method of claim 5 wherein the step of using at least some of the labeled pixels and the edge mask to identify solid region pixels comprises the steps of:
   using line scans to identify a non-edge-pixel segment bounded by a first edge pixel segment and by a second edge pixel segment;
   computing a first color value for the first edge pixel segment, a second color value for the second edge pixel segment, and a non-edge-pixel segment color value for the non-edge-pixel segment; and
   responsive to the difference between the non-edge-pixel segment color value and the average of the first and second color values being below a threshold value, and responsive to a threshold size limit being satisfied, identifying the combined first edge pixel segment, second edge pixel segment, and non-edge-pixel segment as solid region pixels.

7. The method of claim 6 further comprising the steps of:
   excluding from the solid region pixels any pixels with a background label.

8. A tangible computer-readable medium comprising one or more sequences of instructions to direct an instruction-executing device to perform at least the steps of claim 1.

9. A method for compressing an image comprising pixels, the method comprising:
   labeling each pixel from a plurality of pixels selected from the image;
   using the pixel labels to generate a background mask comprising pixels from the plurality of pixels with a background label;
   performing a connected component analysis on non-background pixels of the background mask and responsive to a connected component group of non-background pixels being below a threshold size, selecting pixels corresponding to the connected component group as non-background region pixels;
   generating a foreground image layer comprising the non-background region pixels;
   generating a background image layer comprising pixels with a background label;
   generating a mask layer that identifies from which of the foreground and background image layers a pixel should be selected when generating a representation of the plurality of pixels; and
   compressing the mask layer differently than at least one of the foreground and background image layers.

10. The method of claim 9 wherein the step of labeling each pixel from the plurality of pixels selected from the image comprises the steps of:
    identifying edge pixels using gradient pixels identified in the plurality of pixels, in a first low-pass filtered set of the plurality of pixels, and in a second low-pass filtered set of the plurality of pixels;
    determining an edge pixel type for each of the identified edge pixels; and using at least some of the identified edge pixels to label each pixel of the plurality of pixels.

11. The method of claim 9 further comprising the steps of:
generating an edge mask comprising pixels labeled as edge pixels;
using at least some of the labeled pixels and the edge mask to identify solid region pixels; and
including the solid region pixels as non-background pixels in the foreground image layer.

12. The method of claim 11 wherein the step of using at least some of the labeled pixels and the dilated edge mask to identify solid region pixels comprises the steps of:
using line scans to identify a non-edge-pixel segment bounded by a first edge pixel segment and a second edge pixel segment;
computing a first color value for the first edge pixel segment, a second color value for the second edge pixel segment, and a non-edge-pixel segment color value for the non-edge-pixel segment; and
responsive to the difference between the non-edge-pixel segment color value and the average of the first and second color values being below a threshold value, and responsive to a threshold size limit being satisfied, identifying the combined first edge pixel segment, second edge pixel segment, and non-edge-pixel segment as solid region pixels.

13. The method of claim 9 wherein the threshold size of the connect component group refers to the number of pixels of the connect component group or to a size of a region that bounds the connect component group.

14. A tangible computer-readable medium comprising one or more sequences of instructions to direct an instruction-executing device to perform at least the steps of claim 9.

15. A system for compressing an image comprising:
a pixel labeler, coupled to receive an image comprising pixels, that labels each pixel of a plurality of pixel selected from the image;
a background estimator, coupled to receive information from the pixel labeler, that attempts to estimate a background color of the plurality of pixels and responsive to estimating the background color, relabels the label associated with at least one pixel of the plurality of pixels;
a background mask and edge mask generator, coupled to receive information from the background estimator, that generates a background mask comprising pixels from the plurality of pixels with a background label and that generates an edge mask comprising pixels with an edge pixel label;
a non-background region extractor, coupled to receive information from the background mask generator, that performs a connected component analysis on the non-background pixels of the background mask and responsive to a connected component group of non-background pixels being below a threshold size, identifying pixels that correspond to the connected component group as non-background pixels;
an image layer separator, coupled to receive information from the non-background region extractor, that generates a foreground image layer comprising non-background pixels, a background image layer comprising pixels with a background label, and generates a mask layer that identifies from which of the foreground and background image layers a pixel should be selected when generating a representation of the plurality of pixels; and
a layer-based compression module, coupled to receive information from the image layer separator, that compresses the mask layer differently than at least one of the foreground and background image layers.

16. The system of claim 15, wherein the pixel labeler labels the plurality of pixels selected from the image by:
identifying edge pixels using gradient pixels identified in the plurality of pixels, in a first low-pass filtered set of the plurality of pixels, and in a second low-pass filtered set of the plurality of pixels;
determining an edge pixel type for each of the identified edge pixels; and
using at least some of the identified edge pixels to label each pixel of the plurality of pixels.

17. The system of claim 15 further comprising:
a mode selector, that receives for a selected mode and provides information to the image layer separator to generate the foreground layer according to the selected mode; and
a solid region extractor, coupled to receive information from the mode selector, that, responsive to a specific selected mode, identifies solid region pixels in the edge mask using line scans so that the identified solid region pixels may be included as non-background pixels in the foreground image layer.

18. The system of claim 17 wherein the solid region extractor identifies solid region pixels by performing the steps comprising:
using line scans in the edge mask to identify a non-edge-pixel segment bounded by a first edge pixel segment and a second edge pixel segment;
computing a first color value for the first edge pixel segment, a second color value for the second edge pixel segment, and a non-edge-pixel segment color value for the non-edge-pixel segment; and
responsive to the difference between the non-edge-pixel segment color value and the average of the first and second color values being below a threshold value, and responsive to a threshold size limit being satisfied, identifying the combined first edge pixel segment, second edge pixel segment, and non-edge-pixel segment as solid region pixels.

19. The system of claim 18 wherein the solid region extractor excludes from the solid region pixels any pixels with a background label.

20. The system of claim 15 further comprising:
a layer-based color enhancer, coupled to receive information from the image layer separator, that smoothes and color enhances at least some of the non-background pixels in the foreground image layer; and
a background color suppressor, coupled to receive information about the background image layer and coupled to provide information to the layer-based compression module, that, responsive to estimating a light colored background, adjusts at least one background pixel's color of the background image layer toward white.

* * * * *